(12) United States Patent  
Johnson et al.

(10) Patent No.: US 7,444,869 B2  
(45) Date of Patent: Nov. 4, 2008

(54) FORCE REBALANCING AND PARAMETRIC AMPLIFICATION OF MEMS INERTIAL SENSORS

(75) Inventors: Burgess R. Johnson, Bloomington, MN (US); Eugen I. Cabuz, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/549,769

(22) Filed: Oct. 16, 2006

(65) Prior Publication Data

US 2008/0236280 A1    Oct. 2, 2008

Related U.S. Application Data

(63) Continuation-in-part of application No. 11/427,767, filed on Jun. 29, 2006.

(51) Int. Cl.  
*G01P 9/04* (2006.01)

(52) U.S. Cl. .................... 73/504.12; 73/504.14

(58) Field of Classification Search ............... 73/504.02, 73/504.04, 504.12, 504.14, 504.15, 504.16, 73/504.13, 514.32, 514.16  
See application file for complete search history.

(56) References Cited

U.S. PATENT DOCUMENTS

| | | | |
|---|---|---|---|
| 5,650,568 A * | 7/1997 | Greiff et al. | 73/504.09 |
| 5,767,405 A * | 6/1998 | Bernstein et al. | 73/504.16 |
| 6,374,672 B1 * | 4/2002 | Abbink et al. | 73/504.12 |
| 6,715,353 B2 * | 4/2004 | Johnson | 73/504.04 |

* cited by examiner

*Primary Examiner*—Helen C. Kwok  
(74) *Attorney, Agent, or Firm*—Black Lowe & Graham PLLC

(57) ABSTRACT

MEMS devices and methods for measuring Coriolis forces using force rebalancing and parametric gain amplification techniques are disclosed. A MEMS inertial sensor can include one or more proof masses, at least one sense electrode positioned adjacent to each proof mass, a number of torquer electrodes for electrostatically nulling quadrature and Coriolis-related proof mass motion, and a number of pump electrodes for producing a pumping force on the proof masses. Force rebalancing voltages can be applied to some torquer electrodes to electrostatically null quadrature and/or Coriolis-related proof mass motion along a sense axis of the device. A pumping voltage at approximately twice the motor drive frequency of the proof masses can be used to pump the proof masses along the sense axis.

19 Claims, 17 Drawing Sheets

FORCE REBALANCING AND PARAMETRIC AMPLIFICATION OF MEMS INERTIAL SENSORS

CROSS REFERENCE TO RELATED APPLICATION

The present invention is a continuation-in-part of U.S. patent application Ser. No. 11/427,767, entitled "Force Rebalancing for MEMS Inertial Sensors Using Time-Varying Voltages", as filed on Jun. 29, 2006.

GOVERNMENT SUPPORT

This invention was made with government support under U.S. Army CERDEC contract number W15P7T-05-C-P609. The government may have certain rights in the invention.

FIELD

The present invention relates generally to the field of microelectromechanical (MEMS) devices. More specifically, the present invention pertains to devices and methods for reducing rate bias errors and scale factor errors and improving scale factor using time-varying force rebalancing voltages and parametric gain amplification.

BACKGROUND

Microelectromechanical (MEMS) gyroscopes are used to detect angular rotation about an input axis by measuring Coriolis forces exerted on a number of resonating proof masses. A typical MEMS gyroscope includes two silicon proof masses mechanically coupled to a silicon or glass substrate by suspension springs. A number of recesses etched into the substrate allow selective portions of the silicon structure to move back and forth freely within an interior portion of the device. A pattern of metal traces formed on the substrates can be used to deliver various electrical bias voltages and signal outputs to the device.

The drive system for MEMS gyroscopes typically includes a number of drive elements that cause the proof masses to oscillate back and forth along a drive axis perpendicular to the direction in which Coriolis forces are sensed. A motor mode of the gyroscope may comprise two proof masses moving at equal but opposite velocities in a direction substantially parallel to the substrate and along a line connecting the centers of the proof masses. In some applications, the motor mode of the proof masses can be driven electrostatically at its resonant frequency using a number of interdigitated comb drive fingers adapted to convert electrical energy into mechanical energy by electrostatic actuation. When the gyroscope is rotated about its input axis perpendicular to the drive axis, the motor mode velocity of the proof masses produces a Coriolis force that drives the proof masses along a sense axis perpendicular to the drive axis and input axis.

The sensing system of the gyroscope may include one or more sense electrodes that can be charged with a DC sense bias voltage to produce an electric field in the spaces between the sense electrodes and proof masses. A sense resonant mode of the gyroscope typically includes movement of the two proof masses at equal but opposite velocities along the sense axis. The Coriolis force due to the motor velocity drives the sense resonant mode, typically at or near the frequency of motor motion. In some designs, the Coriolis force drives the sense mode off-resonance.

As each proof mass moves back and forth above the substrate, the Coriolis force resulting from rotation of the gyroscope about the input axis causes the spacing between the proof masses and sense electrodes to vary. The displacement of sense resonant mode motion can then be determined capacitively by detecting the current induced on the proof masses due to the time-varying sense capacitance. By measuring the output current produced on the proof masses, a measure of the rotational motion and/or acceleration of the gyroscope can be ascertained.

A significant source of errors in many MEMS-type gyroscopes is attributable to quadrature motion of the proof masses, defined as motion along the sense axis 90° out-of-phase with the motion produced by the Coriolis force. The resultant mechanical feedthrough signal caused by such quadrature motion is often referred to as the quadrature signal, and typically includes an AC output signal of the gyroscope that is 90° out-of-phase with the signal produced by the Coriolis force. Such quadrature may result, for example, from imperfections in the profile of the comb fingers and suspension springs used in the drive system, and from other imperfections created during the manufacturing process. Such imperfections or errors can result in the motor motion producing a quadrature force on the sense mode motion that is in-phase with the motor displacement, and therefore out-of-phase with the motor velocity.

The quadrature force may be several orders of magnitude greater than the smallest detectable Coriolis force, affecting the ability of the gyroscope to accurately discern subtle variations in the rate signal. As a result, additional error correction circuitry is typically required to remove the quadrature signal from the output sense signal. While the effect of the quadrature force on the gyroscopic rate output signal is typically reduced by the fact that it is 90° out-of-phase with the Coriolis force, small phase errors in the inertial sensor and associated electronics can nevertheless produce errors in the rate output signal, diminishing the ability of the gyroscope to accurately detect and measure rotation.

SUMMARY

The present invention relates to devices and methods for reducing rate bias errors and scale factor errors using time-varying rebalancing voltages. A MEMS inertial sensor in accordance with an illustrative embodiment can include one or more proof masses adapted to oscillate in a drive axis above a substrate, a sense electrode positioned adjacent to each of the one more proof masses, and at least one torquer electrode positioned adjacent to each of the one or more proof masses.

Time-varying rebalancing voltages applied to one or more of the torquer electrodes can be configured to electrostatically null proof mass motion along a sense axis perpendicular to the drive axis, thus maintaining a fixed capacitance between each sense electrode and corresponding proof mass. In certain embodiments, the time-varying rebalancing voltages applied to each of the torquer electrodes can include an AC rebalancing voltage having a rebalancing voltage signal component based on feedback from one or more force rebalancing control loops. During operation, the output of the inertial sensor is the rebalancing voltage used to provide the necessary feedback force to null the Coriolis and quadrature forces on the proof masses rather than the currents induced by proof mass displacement.

In some embodiments, the electrostatic nulling of quadrature and Coriolis related proof mass motions can be accomplished using sinusoidal rebalancing voltages applied to the one or more torquer electrodes. In one illustrative embodiment, for example, sinusoidal rebalancing voltages can be applied to one or more of the torquer electrodes to cancel both quadrature and Coriolis related proof mass motions, thus maintaining a fixed capacitance between each sense electrode and corresponding proof mass. In other embodiments, maintenance of a fixed capacitance between each sense electrode and corresponding proof mass can be accomplished using separate sinusoidal voltages for rebalancing quadrature and Coriolis motion with separate voltages each applied to separate torquer electrodes. The sinusoidal rebalancing voltages applied to the torquer electrodes can be controlled in closed-loop fashion based at least in part on feedback signals received from the output of the inertial sensor.

An illustrative method of force rebalancing a MEMS inertial sensor can include the steps of providing at least one torquer electrode adjacent to each of the one or more proof masses, applying one or more time-varying rebalancing voltages to at least one torquer electrode, sensing displacement of the one or more proof masses along the sense axis and outputting a sense voltage proportional to such proof mass displacement, and electrostatically nulling any proof mass motion along the sense axis based on the outputted sense voltage. By employing a force rebalancing method that compensates for many of the non-linearities associated with capacitively sensing proof mass displacement, the inertial sensor can be configured to operate over a wider dynamic range while eliminating or reducing rate bias and scale factors errors than can diminish sensor performance. Other factors such as sensor reliability, sensor life, and long term drift may also be improved in certain circumstances using force rebalancing.

In some embodiments, the MEMS inertial sensor can be further configured to operate as a parametric amplifier using pump voltages applied to a second number of pump electrodes in addition to the force rebalancing electrodes. The pump voltages applied to the pump electrodes can have a frequency at approximately twice the motor frequency of the proof masses, producing a concomitant pumping force at twice the motor frequency. In some embodiments, the pump voltages can include a DC bias voltage component and an AC pump voltage component adapted to modulate a resonant frequency of the proof masses along the sense axis. During operation, the pumping forces due to the pump voltages produce non-linear mechanical and/or electrical mixing within the inertial sensor that can be used to amplify the Coriolis-related motion and suppress the quadrature-related motion of the proof masses.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. While the various drawings illustrated are described with respect to MEMS-type in-plane gyroscopes, it should be understood that the features and methods herein could be used with other MEMS devices employing electrostatic actuators such z-axis or out-of-plane gyroscopes, which have their input rotation perpendicular to the substrate.

Figure 1:
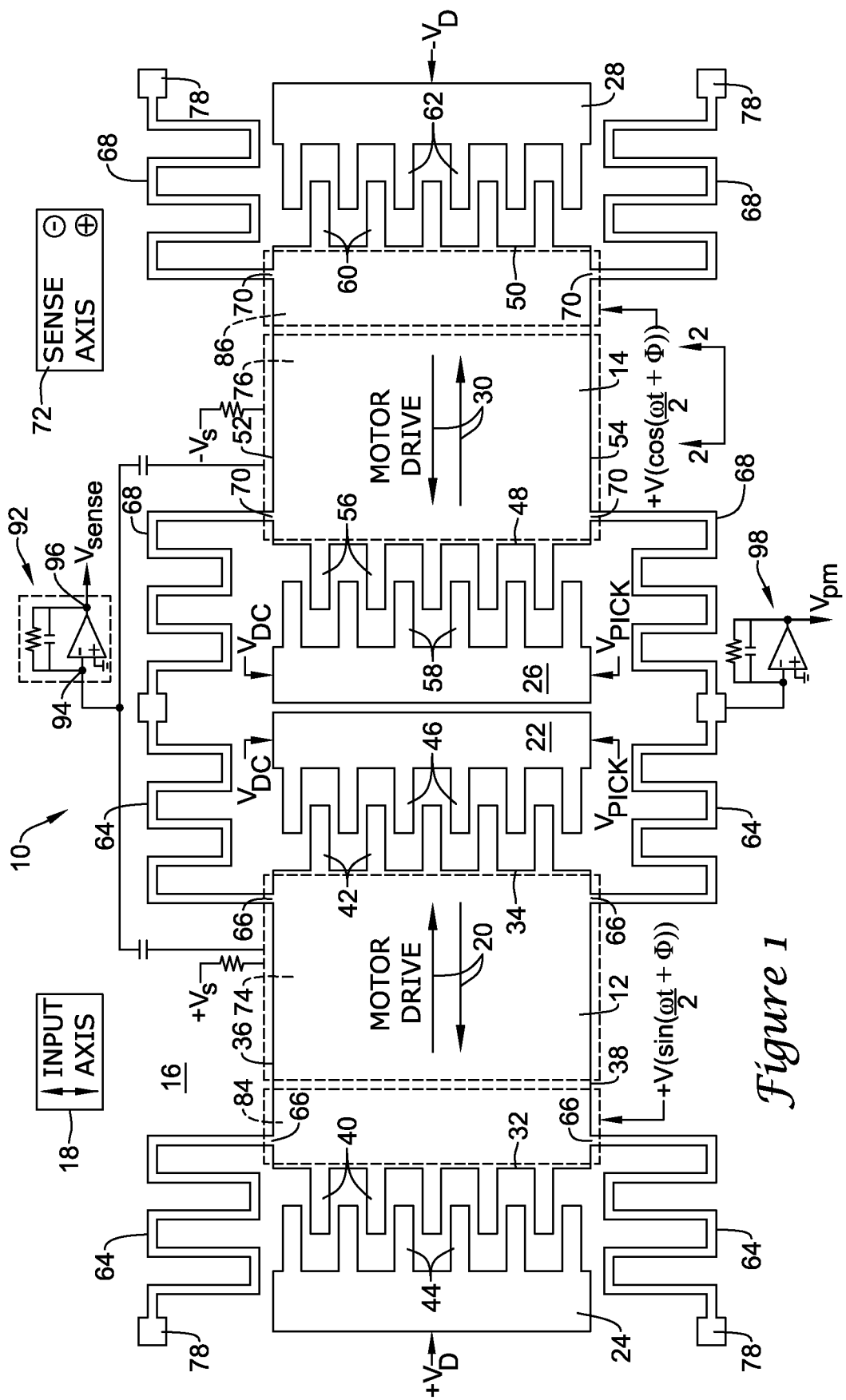
FIG. 1 is a schematic view of an illustrative MEMS-type gyroscope in accordance with an exemplary embodiment of the present invention.

Referring now to FIG. 1, a schematic view of an illustrative MEMS-type gyroscope 10 in accordance with an exemplary embodiment of the present invention will now be described. Gyroscope 10, illustratively an in-plane gyroscope (IPG), includes a first proof mass 12 and second proof mass 14, each of which are adapted to oscillate back and forth above an underlying support substrate 16 along a drive axis perpendicular to an input axis 18 of the gyroscope 10 in which inertial motion is to be determined. As indicated generally by the right/left set of arrows 20, the first proof mass 12 can be configured to oscillate back and forth above the support substrate 16 between a first motor pickoff comb 22 and first drive electrode 24, both of which remain stationary above the support substrate 16 to limit movement of the first proof mass 12. The second proof mass 14, in turn, can be configured to oscillate back and forth above the support substrate 16 in a similar manner between a second motor pickoff comb 26 and second drive electrode 28, but 180° degrees out-of-phase with the first proof mass 12, as indicated generally by the left/right set of arrows 30.

The first proof mass 12 can include a thin plate or other suitable structure having a first end 32, a second end 34, a first side 36, and a second side 38. Extending outwardly from each end 32,34 of the first proof mass 12 are a number of comb fingers 40,42 used to electrostatically drive the first proof mass 12 in the direction indicated by the right/left set of arrows 20. In the illustrative gyroscope 10 depicted in FIG. 1, for example, a first set of comb fingers 40 extending outwardly from the first end 32 of the first proof mass 12 can be interdigitated with a corresponding set of comb drive fingers 44 formed on the first drive electrode 24. A second set of comb fingers 42 extending outwardly from the second end 34 of the first proof mass 12, in turn, can be interdigitated with a corresponding set of comb fingers 46 formed on the first motor pickoff comb 22.

The second proof mass 14 can be configured similar to the first proof mass 12, having a first end 48, a second end 50, a first side 52, and a second side 54. A first set of comb fingers 56 extending outwardly from the first end 48 of the second proof mass 16 can be interdigitated with a corresponding set of comb fingers 58 formed on the second motor pickoff comb 26. A second set of comb fingers 60 extending outwardly from the second end 50 of the second proof mass 14, in turn, can be interdigitated with a corresponding set of comb fingers 62 formed on the second drive electrode 28.

The first and second proof masses 12,14 can be constrained in one or more directions above the underlying support structure 16 using one or more suspension springs. As shown in FIG. 1, for example, the first proof mass 12 can be anchored or otherwise coupled to the support substrate 16 using a first set of four suspension springs 64, which can be connected at each end 66 to the four corners of the first proof mass 12. In similar fashion, the second proof mass 14 can be anchored to the underlying support substrate 16 using a second set of four springs 68, which can be connected at each end 70 to the four corners of the second proof mass 14. In use, the suspension springs 64,68 can be configured to isolate oscillatory movement of the first and second proof masses 12,14 to the direction indicated generally by the right/left set of arrows 20,30 to reduce undesired perpendicular motion in the direction of the input axis 18, and to reduce quadrature motion along a sense axis 72 of the gyroscope 10 in which Coriolis forces are sensed. In addition to supporting the proof masses 12,14 above the support substrate 16, the suspension springs 64,68 can also be configured to provide restorative forces along the drive axis when the proof masses are displaced from their equilibrium position along the drive axis.

A drive voltage $V_D$ can be applied to the first and second drive electrodes 24,28, inducing an electrostatic force between the interdigitated comb fingers that causes the comb fingers to electrostatically move with respect to each other. The drive voltage $V_D$ can be configured to output a time-varying voltage signal to alternate the charge delivered to the comb fingers, which in conjunction with the suspension springs 64,68, causes the first and second proof masses 12,14 to oscillate back and forth in a particular manner above the support substrate 16. Typically, the drive voltage $V_D$ will have a frequency that corresponds with the resonant frequency of the first and second proof masses 12,14, although other desired drive frequencies can be employed, if desired.

A motor pickoff bias voltage $V_{DC}$ can be provided across the first and second motor pickoff combs 22,26 to detect and/or measure displacement of the proof masses 12,14 along the direction 20,30 of the drive motion. A motor pickoff voltage $V_{PICK}$ resulting from movement of the comb fingers 42,56 on the first and second proof masses 12,14 relative to the comb fingers 46,58 on the first and second motor pickoff combs 22,26 can be used to detect motion of the first and second proof masses 12,14.

A number of sense electrodes 74,76 can be provided as part of the sensing system to detect and measure the out-of-plane deflection of the first and second proof masses 12,14 along the sense axis 72 as a result of gyroscopic movement about the input axis 18. As indicated generally by the dashed lines in FIG. 1, the sense electrodes 74,76 can include a thin, rectangular-shaped electrode plate positioned underneath at least a portion of the proof masses 12,14. In some embodiments, a second number of sense electrodes 78,80 formed on an upper substrate 82 of the gyroscope 10 (see FIGS. 2 and 3) can be further positioned above each of the proof masses 12,14, if desired. The sense electrodes 74,76,78,80 can be configured in size and shape to minimize electrical interference with the surrounding comb fingers 42,56 to prevent leakage of the drive voltage $V_D$ signal into the sense signal.

A DC sense bias voltage $V_S$ applied to each of the sense electrodes 74,76,78,80 can be utilized to induce a charge on the first and second proof masses 12,14 proportional to the capacitance between the respective sense electrode 74,76,78, 80 and proof mass 12,14.

A number of torquer electrodes 84,86 can be configured to mechanically null any motion of the proof masses 12,14 along the sense axis 72 due to Coriolis forces caused by rotation of the gyroscope 10 about the input axis 18 and/or from any quadrature forces. The torquer electrodes 84,86 can be configured similar to the sense electrodes 74,76,78,80, each comprising a thin rectangular-shaped electrode plate positioned underneath at least a portion of the proof masses 12,14. In some embodiments, a second number of torquer electrodes 88,90 can be further positioned above each of the proof masses 12,14, if desired. The torquer electrodes 84,86, 88,90 can be configured in size and shape to minimize electrical interference with the surrounding comb fingers 40,60 and sense electrodes 74,76,78,80.

During operation, the sense electrodes 74,76,78,80 can be used to sense motion of the proof masses 12,14 along the sense axis 72 as a result of Coriolis forces and any quadrature forces. The sense bias voltage $V_S$ applied to the sense electrodes 74,76,78,80 produces a charge on each of the proof masses 12,14 proportion to their out-of-plane displacement, producing a current that is fed to a charge amplifier 92 having an input node 94 and an output node 96. The charge amplifier 92 converts the current produced by the time-varying sense capacitances into an output sense voltage $V_{sense}$ proportional to the electrostatic nulling force required to maintain zero displacement of the proof masses 12,14 along the sense axis 72. In some embodiments, a second charge amplifier 98 coupled to each of the proof masses 12,14 and adapted to output a voltage signal $V_{PM}$ can be used to maintain the proof masses 12,14 at virtual ground. Alternatively, and in other embodiments, the proof masses 12,14 can be hard ground.

Time-varying rebalancing voltages applied to each of the torquer electrodes 84,86,88,90 can be utilized to electrostatically null any motion of the proof masses 12,14 along the sense axis 72, thereby maintaining a fixed capacitance between the sense electrodes 74,76,78,80 and the proof masses 12,14. In certain embodiments, and as described in greater detail below with respect to FIG. 3, the time-varying rebalancing voltages may comprise closed-loop AC feedback control signals obtained by passing the output sense voltage $V_{sense}$ of the charge amplifier 92 through one or more feedback control loops. As shown in FIG. 1, the rebalancing voltage $V \sin(\omega t/2+\Phi)$ applied to the torquer electrode 84 adjacent the first proof mass 12 can be 90° out-of-phase with the rebalancing voltage V cos(ωt/2+Φ) applied to the torquer electrode 86 adjacent the second proof mass 14. A phase offset factor Φ can be used by the feedback control electronics to provide nulling of the Coriolis and quadrature force simultaneously.

To ensure that the output signal from the charge amplifier 92 is sensitive to only differential motion of the proof masses 12,14 along the sense axis 72, the sense bias voltage $V_S$ used to sense motion of the first proof mass 12 can have a polarity opposite that of the sense bias voltage $V_S$ used to sense motion of the second proof mass 14. In certain embodiments, for example, a sense bias voltage $V_S$ of +5V and −5V, respectively, can be applied to each of the lower sense electrodes 74,76 and upper electrodes 78,80 so that the voltage at the output node 96 of the charge amplifier 92 is sensitive only to differential mode motion of the proof masses 12,14.

Figure 2:
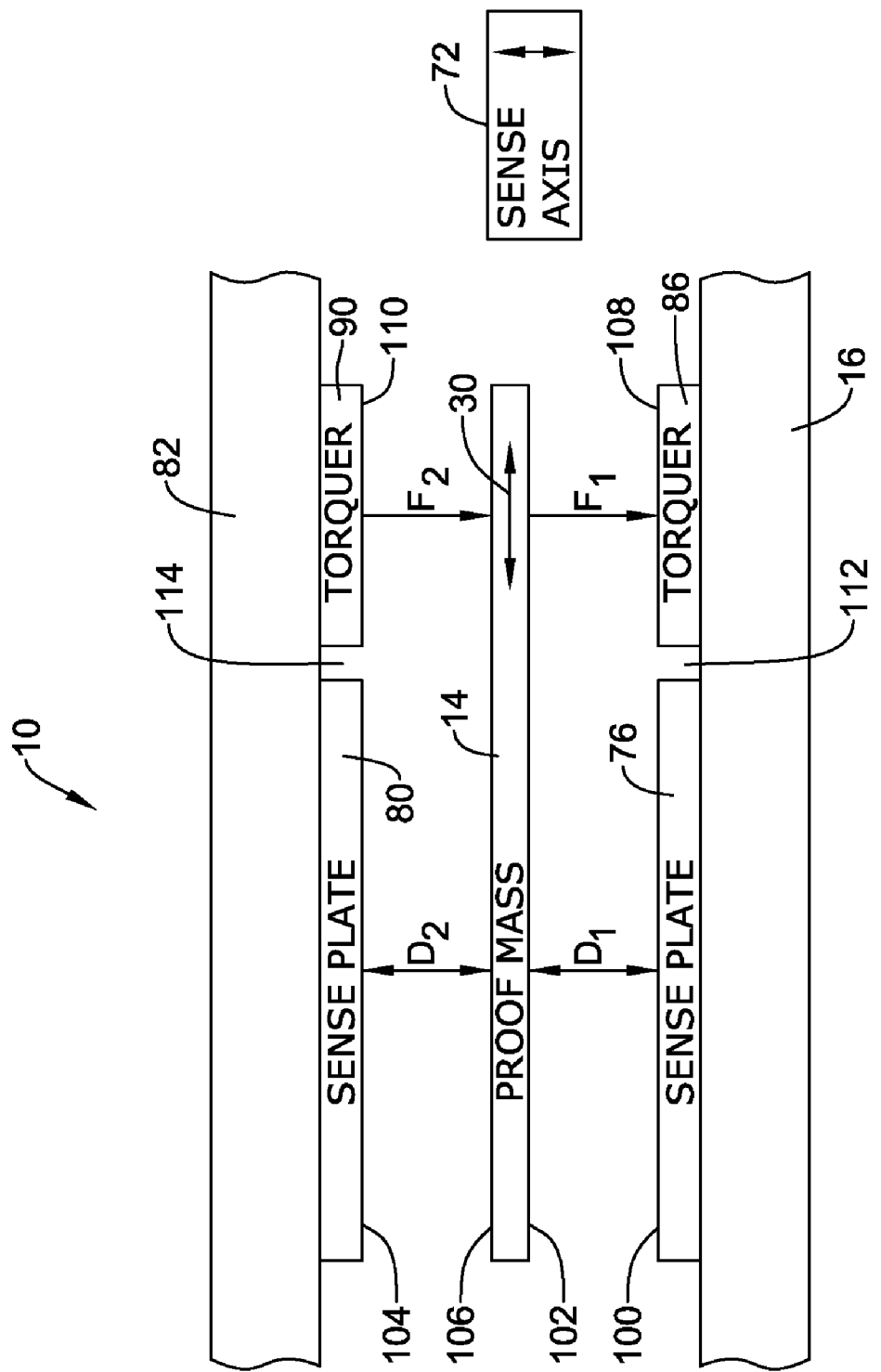
FIG. 2 is a side cross-sectional view showing the illustrative gyroscope along line 2-2 of FIG. 1.

FIG. 2 is a side cross-sectional view illustrating the operation of the sense electrodes and torquer electrodes of FIG. 1 in greater detail. As shown in FIG. 2, the lower sense electrode 76 can be positioned on or in the lower substrate 16 of the gyroscope 10, and can be oriented in a manner such that an upper face 100 thereof is positioned vertically adjacent to and parallel with the bottom surface 102 of the proof mass 14. The upper sense electrode 80, in turn, can be positioned on or in the upper substrate 82 of the gyroscope 10, and oriented in a manner such that a lower face 104 thereof is positioned vertically adjacent to and parallel with the top surface 106 of the proof mass 14. The lower and upper sense electrodes 76,80 can each be spaced a distance $D_1$ and $D_2$, respectively, away from the bottom and upper surfaces 102,106 of the proof mass 14. Typically, the lower and upper sense electrodes 76,80 will be spaced the same distance from the proof mass 14 (i.e. $D_1=D_2$), although other embodiments wherein the sense electrodes 76,80 are spaced at varying distances (i.e. D1≠D2) from the proof mass 14 are also contemplated.

The lower and upper torquer electrodes 84,86 88,90 can be positioned on or in the substrates 16,82 in a manner so as to provide electrostatic forces on the proof masses 12,14 that mechanically null any proof mass motion along the sense axis 72. In the illustrative embodiment depicted, for example, the lower torquer electrode 86 can be positioned on or in the lower substrate 16 of the gyroscope 10, and can be oriented in a manner such that an upper face 108 thereof is positioned vertically adjacent to and parallel with the bottom surface 102 of the proof mass 14. The upper torquer electrode 90, in turn, can be positioned on or in the upper substrate 82 of the gyroscope 10, and can be oriented in a manner such that a lower face 110 thereof is positioned vertically adjacent to and parallel with the top surface 106 of the proof mass 14. A small, non-conductive gap 112,114 disposed between each torquer electrode 86,90 and laterally adjacent sense electrode 76,80 can be provided to electrically isolate the sense electrodes 76,80 from the torquer electrodes 86,90.

During operation, the Coriolis force resulting from rotational motion of the gyroscope 10 about the input axis 18 as well as any quadrature forces resulting from irregularities in the drive system cause the first and second proof masses 12,14 to move out-of-plane with respect to the sense electrodes 74,76. Such out-of-plane displacement causes a change in the charge on the proof mass 14, producing a current at the input node 94 of the charge amplifier 92.

Based on the magnitude of the voltage $V_{sense}$ outputted from the charge amplifier 92, the rebalancing voltages applied to the torquer electrodes 86,90 can be adjusted to counter the out-of-plane displacement of the proof mass 14, producing an electrostatic force $F_1,F_2$ that acts to maintain a fixed capacitive distance $D_1,D_2$ between the sense electrodes 76,80 and proof mass 14. If, for example, the sensing system detects out-of-plane motion of the proof mass 14 in an upward direction, a rebalancing voltage applied to the lower torquer electrode 86 can be configured to exert a downwardly directed electrostatic force $F_1$ on the proof mass 14. In similar fashion, a rebalancing voltage applied to the upper torquer electrode 90 can be configured to exert a downwardly directed electrostatic force $F_2$ on the proof mass 14, as shown, due to the time-varying characteristics of the voltage. In some embodiments, a rebalancing voltage simultaneously applied to both of the lower and upper torquer electrodes 86,90 can be configured to exert multiple rebalancing forces $F_1,F_2$ on the proof mass 14 at the same time, providing an enhanced level of symmetry to the force rebalancing process.

While the illustrative embodiment depicted in FIG. 2 utilizes multiple sense electrodes 74,76,78,80 and torquer electrodes 84,86,88,90 both below and above each of the proof masses 12,14, it should be understood that the gyroscope 10 could be configured to function using only a single torquer electrode and sense electrode for each proof mass 12,14. In certain embodiments, for example, the gyroscope 10 may include a single torquer electrode positioned above each proof mass 12,14, and a single sense electrode positioned below each proof mass 12,14. An opposite arrangement wherein the sense and torquer electrodes are positioned, respectively, above and below each of the proof masses 12,14 can also be employed. In some embodiments, and as described below with respect to FIGS. 5-7, multiple torquer electrodes can be positioned on or in the lower and/or upper substrates 16,82 to simultaneously and separately compensate for both Coriolis forces and quadrature-related forces on each of the proof masses 12,14, if desired.

Figure 3:
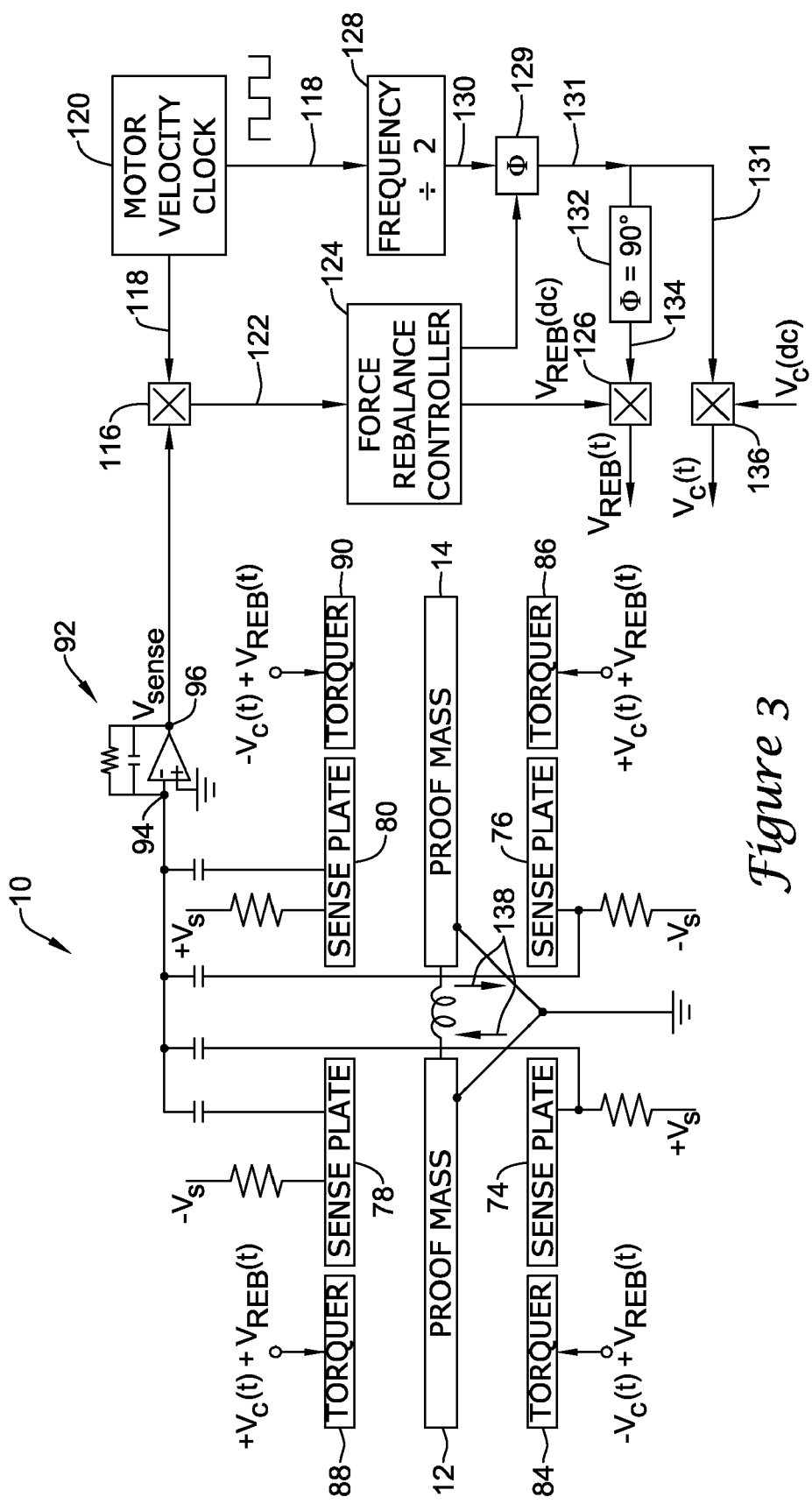
FIG. 3 is a representation of a simplified electromechanical block diagram showing an illustrative force rebalancing control loop for use in controlling the MEMS gyroscope of FIGS. 1-2.

FIG. 3 represents a simplified electromechanical block diagram showing an illustrative force rebalancing control loop for use in controlling the MEMS gyroscope 10 of FIG. 1. As shown in FIG. 3, the sense voltage $V_{sense}$ outputted from the charge amplifier 92 can be fed to a demodulator 116, which demodulates the sense voltage $V_{sense}$ output signal from the charge amplifier 92 with the output signal 118 from the drive motor velocity clock 120, producing a signal 122 having the sum and difference of the frequencies of the two input signals. The resultant voltage signal 122 is then fed to a force rebalance controller 124 (e.g. a proportional-plus-integral-plus-derivative (PID) controller) having various force rebalance control logic (e.g. gain amplifier, phase shifter, filters, control variables, etc.), which, in turn, outputs a DC rebalancing voltage $V_{REB}(dc)$.

To reduce the effects of feedthrough, the DC rebalancing voltage $V_{REB}(dc)$ outputted by the force rebalance controller 124 can be fed to a second mixer 126, which modulates the DC rebalancing voltage $V_{REB}(dc)$ with the motor velocity clock signal 118 to produce a time-varying rebalancing voltage $V_{REB}(t)$. To disassociate the rebalancing voltage $V_{REB}(t)$ signal from the motor velocity clock signal 118, the angular frequency (ω) of the motor velocity clock signal 118 can be reduced by a scale factor of 2 using a frequency divider 128, thus outputting a signal 130 having a frequency half that of the motor velocity clock signal 118. The force rebalancing controller 124 can output a phase adjust signal Φ at block 129, which, when later applied to the DC rebalancing voltage $V_{REB}(dc)$ signal as discussed below, can be used to null the Coriolis and quadrature forces simultaneously.

The frequency divided and phase adjusted signal 131 outputted at block 129 can be fed to a phase shifter 132 that offsets the phase of the signal 131 by 90°, or by some other desired amount. The phase shifted signal 134 can then be fed to the mixer 126 and combined with the DC rebalancing voltage $V_{REB}$(dc) outputted from the force rebalance controller 124, producing a time-varying rebalancing voltage $V_{REB}$(t) signal component having a frequency half that of the motor velocity clock signal 118. By modulating the rebalancing voltage $V_{REB}$(t) at half the motor frequency ($\omega$) of the drive system, the effects of electrical feedthrough within the system can be significantly diminished since the sense pickoff electronics used to measure motor displacement typically use phase sensitive detection at the motor frequency ($\omega$), and thus are not as sensitive to signals at half the motor frequency.

As can be further seen in FIG. 3, the output signal 130 from block 129 can also be combined with an external DC carrier voltage $V_C$(dc) signal via a mixer 136, producing a time-varying carrier voltage $V_C$(t) signal component. The net rebalancing voltage applied to each of the torquer electrodes 84,86,88,90 will typically comprise the sum of the time-varying carrier voltage $V_C$(t) and rebalancing voltage $V_{REB}$(t) signal components, and can be expressed generally by the formula:

$$V(t) = V_C sq\left(\frac{\omega t}{2}\right) + V_{REB} sq\left(\frac{\omega t}{2} + \frac{\pi}{2}\right) \quad (1)$$

where:

$V_C$ is the time-varying carrier voltage signal component;

$V_{REB}$ is the time-varying rebalancing signal component;

$\omega$ is the angular frequency of the motor mode motion of the proof masses; and sq($\theta$) represents a square wave with phase $\theta$ and amplitudes of ±1.

Figure 4:
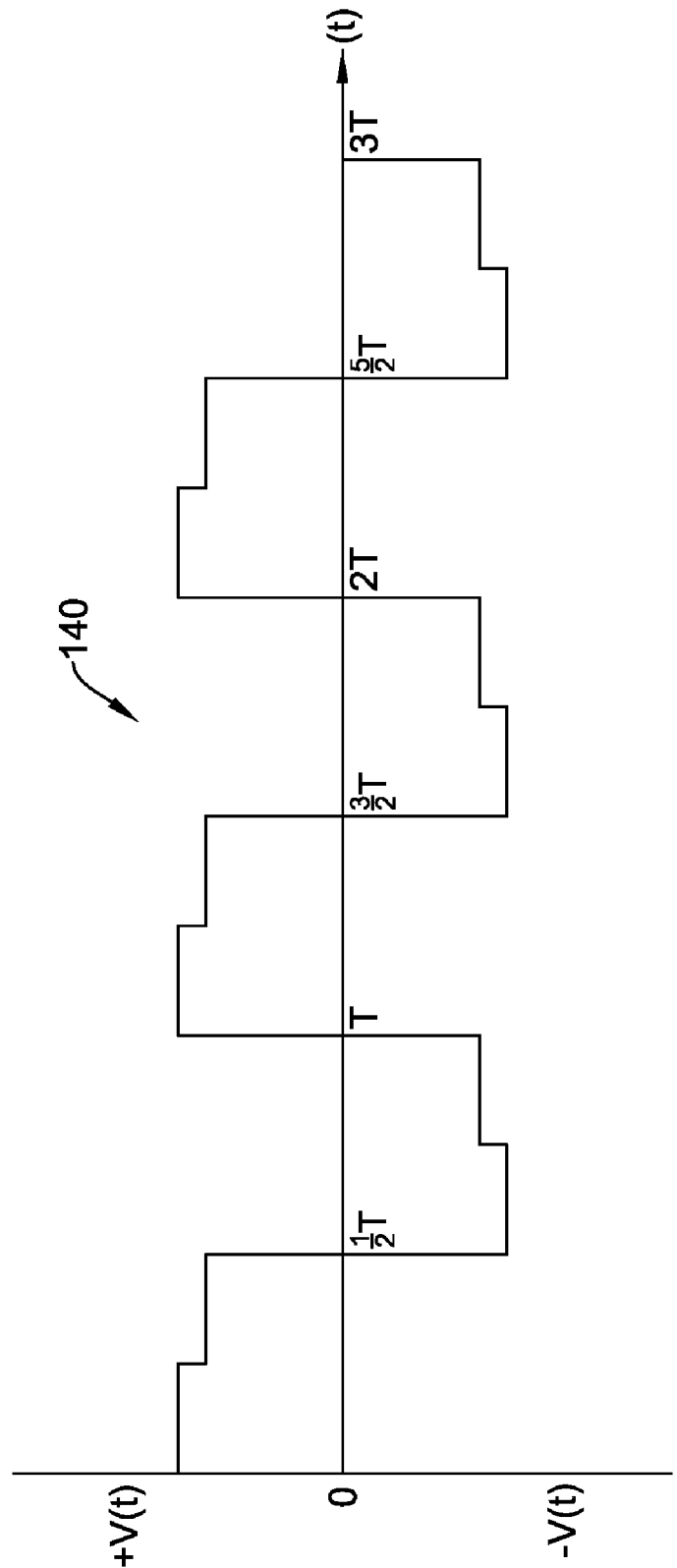
FIG. 4 is a representation of a time-varying waveform for the rebalancing voltage signal applied to the torquer electrodes.

As can be seen from Equation (1) above, the rebalancing voltage V(t) applied to each of the torquer electrodes 84,86,88,90 thus includes a square-wave carrier voltage $V_C$(t) signal component, and a square-wave rebalancing voltage $V_{REB}$(t) signal component that is 90° out-of-phase with the carrier voltage $V_C$(t) signal component. A representation of the waveform produced by the above Equation (1) can be seen in FIG. 4, which shows a modified square wave signal 140 produced by the sum of the carrier voltage $V_C$(t) signal component and rebalancing voltage $V_{REB}$(t) signal component.

The application of the rebalancing voltage V(t) to the torquer electrodes 84,86,88,90 produces a time-varying electrostatic rebalancing force on each of the proof masses 12,14 that acts to constrain differential sense resonant mode motion in the direction indicated generally by the up/down arrows 138 in FIG. 3. The component of the electrostatic rebalancing force $F_y$ induced on the proof masses 12,14 along the sense axis 72 as a result of the applied voltage V(t) of Equation (1) can be expressed generally by the following equation:

$$F_y = \frac{1}{2}\frac{dC}{dy}V^2 = \frac{1}{2}\frac{dC}{dy}[V_C^2 + V_{REB}^2 + 2V_C V_{REB} sq(\omega t)]; \quad (2)$$

where $$\frac{dC}{dy}$$

is the derivative of capacitance of the torquer electrode with respect to proof mass motion along the sense axis 72.

As can be seen from Equation (2) above, the AC component of the electrostatic rebalance force $F_y$ is linear in the rebalancing voltage $V_{REB}$, thus simplifying the control electronics used by the force rebalance controller 124. Moreover, the AC component of the electrostatic rebalancing force $F_y$ is also at the motor frequency ($\omega$) of the drive system, as required for electrostatically nulling quadrature and Coriolis forces which are at the motor frequency $\omega$.

The phase of the rebalance force $F_y$ can be varied by adjusting the phase of the carrier voltage $V_C$(t) and/or rebalancing voltage $V_{REB}$(t) signal components of the rebalancing voltage V(t), allowing the selective rebalancing or control of the Coriolis and/or quadrature-related forces. In certain embodiments, for example, the selective control of the Coriolis force and quadrature forces can accomplished, for example, by varying the phase $\Phi$ of the rebalancing voltage $V_{REB}$(t) via the force rebalance controller 124, by using a separate phase shifter for the carrier voltage $V_C$(t) signal component (e.g. at the input to mixer 136), or by other suitable means. While the rebalancing voltage $V_{REB}$(t) will typically be maintained 90° out-of-phase with the motor velocity clock signal 118, it should be understood that the rebalancing voltage $V_{REB}$(t) could be offset by other amounts, if desired.

The force rebalance controller 124 will typically include control electronics adapted to operate over a relatively high control loop bandwidth while injecting relatively low levels of noise into the rebalancing voltage $V_{REB}$(t) signal component, allowing the gyroscope 10 to accurately detect Coriolis forces across a wide dynamic range. In certain embodiments, for example, the noise level should be such that rotation rates as low as 0.01 deg/hr and as high as 500 deg/sec can be accurately sensed. The dynamic range of the gyroscope 10 may vary, however, depending on the particular application.

By operating the gyroscope 10 as a null detector instead of measuring voltage resulting from proof mass displacement, the gyroscope 10 can be configured to operate over greater dynamic ranges than many convention MEMS gyroscopes. Moreover, bias stability often caused by the phase shift of the quadrature motion produced by damping of the sense resonant mode can be further improved by force rebalancing the proof masses 12,14, in some cases by two or more orders of magnitude. Since the output signal is a direct measure of the Coriolis force, and is therefore independent of the resonant frequencies of the gyroscope 10, the occurrence of scale factor errors can also be significantly reduced by force rebalancing the proof masses 12,14. Other factors such as sensor reliability, sensor life, and long term drift may also be improved in certain circumstances.

Figure 5:
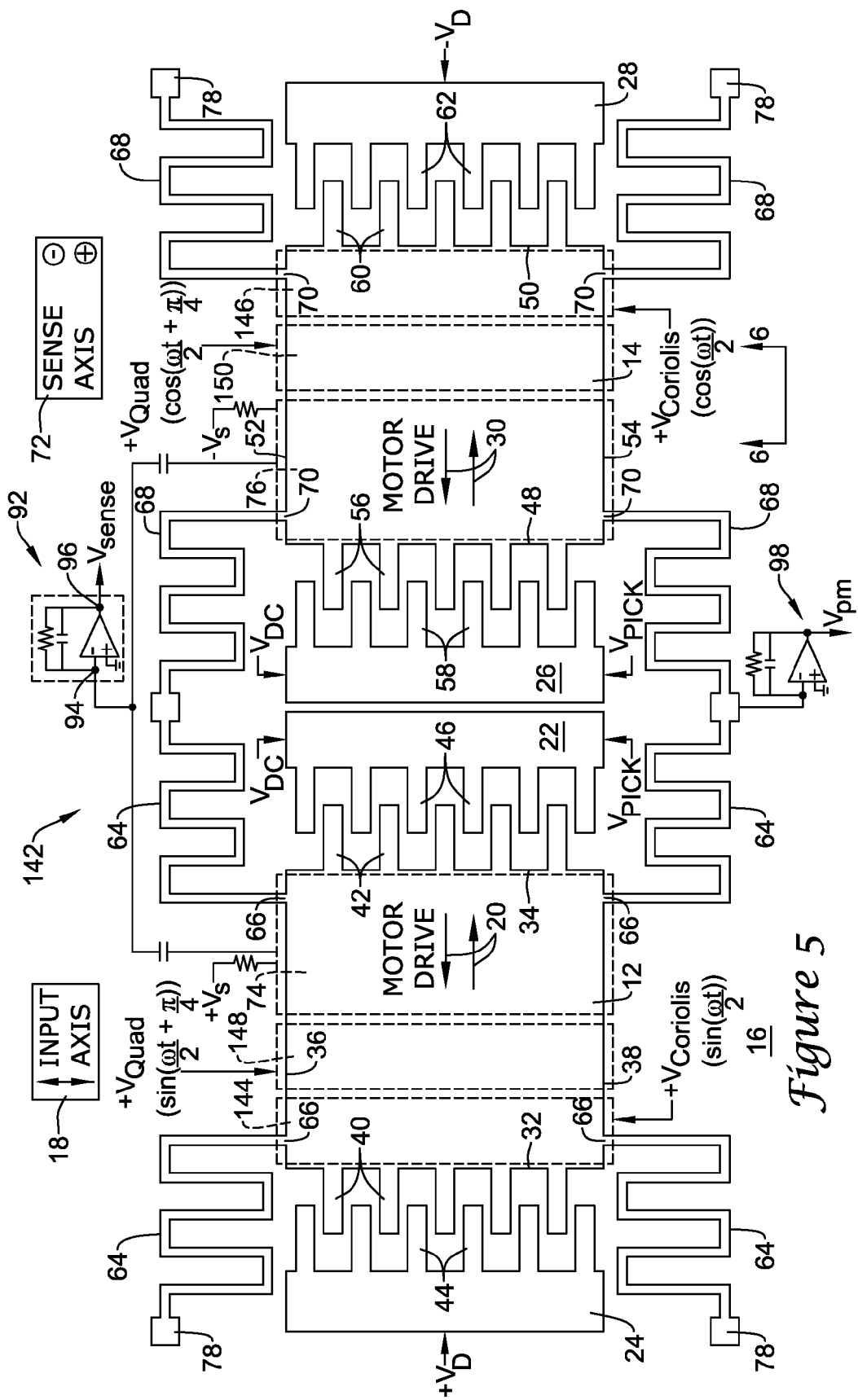
FIG. 5 is a schematic view showing another illustrative MEMS-type gyroscope utilizing separate torquer electrodes for simultaneously nulling Coriolis and quadrature phases of sense axis motion.

FIG. 5 is a schematic view of an illustrative MEMS-type gyroscope 142 in accordance with another exemplary embodiment of the present invention employing separate electrodes for simultaneously controlling both the Coriolis and quadrature phases of the sense axis motion. Gyroscope 142 is similar to the gyroscope 10 described above, with like elements in the drawings being numbered in like fashion. In the illustrative embodiment of FIG. 5, however, the gyroscope 142 includes a first set of electrodes 144,146 adapted to mechanically null Coriolis-related motion of the proof masses 12,14 along the sense axis 72, and a second set of electrodes 148,150 adapted to mechanically null quadrature-related motion of the proof masses 12,14 along the sense axis 72.

The torquer electrodes 144,146,148,150 can be configured similar to the torquer electrodes 84,86 described above with respect to FIGS. 1-2, each comprising a thin rectangular-shaped electrode plate positioned underneath at least a portion of the proof masses 12,14. In some embodiments, a separate set of Coriolis-related torquer electrodes 152,154 and quadrature-related torquer electrodes 156,158 (see FIGS. 6-7) can be further positioned above each of the proof masses 12,14 to control of Coriolis and quadrature forces from a position adjacent the proof masses 12,14.

To simultaneously control both the Coriolis and quadrature forces on the proof masses 12,14, the gyroscope 142 may utilize multiple force rebalancing control loops, each configured to produce a separate rebalancing voltage signal for independently controlling the first set of torquer electrodes 144,146,152,154 and the second set of torquer electrodes 148,150,156,158. In the illustrative embodiment of FIG. 5, for example, time-varying rebalancing voltages $V_{Coriolis}(\sin(\omega t/2))$, $V_{Coriolis}(\cos(\omega t/2))$ applied to the first set of torquer electrodes 144,146,152,154 can be utilized to electrostatically null any Coriolis-related motion of the proof masses 12,14 along the sense axis 72. Separate time-varying rebalancing voltages $V_{quad}(\sin(\omega t/2+\pi/4))$, $V_{quad}(\cos(\omega/2+\pi/4))$ applied to the second set of torquer electrodes 148,150,156, 158, in turn, can be utilized to electrostatically null any quadrature-related motion of the proof masses 12,14 along the sense axis 72.

Figure 6:
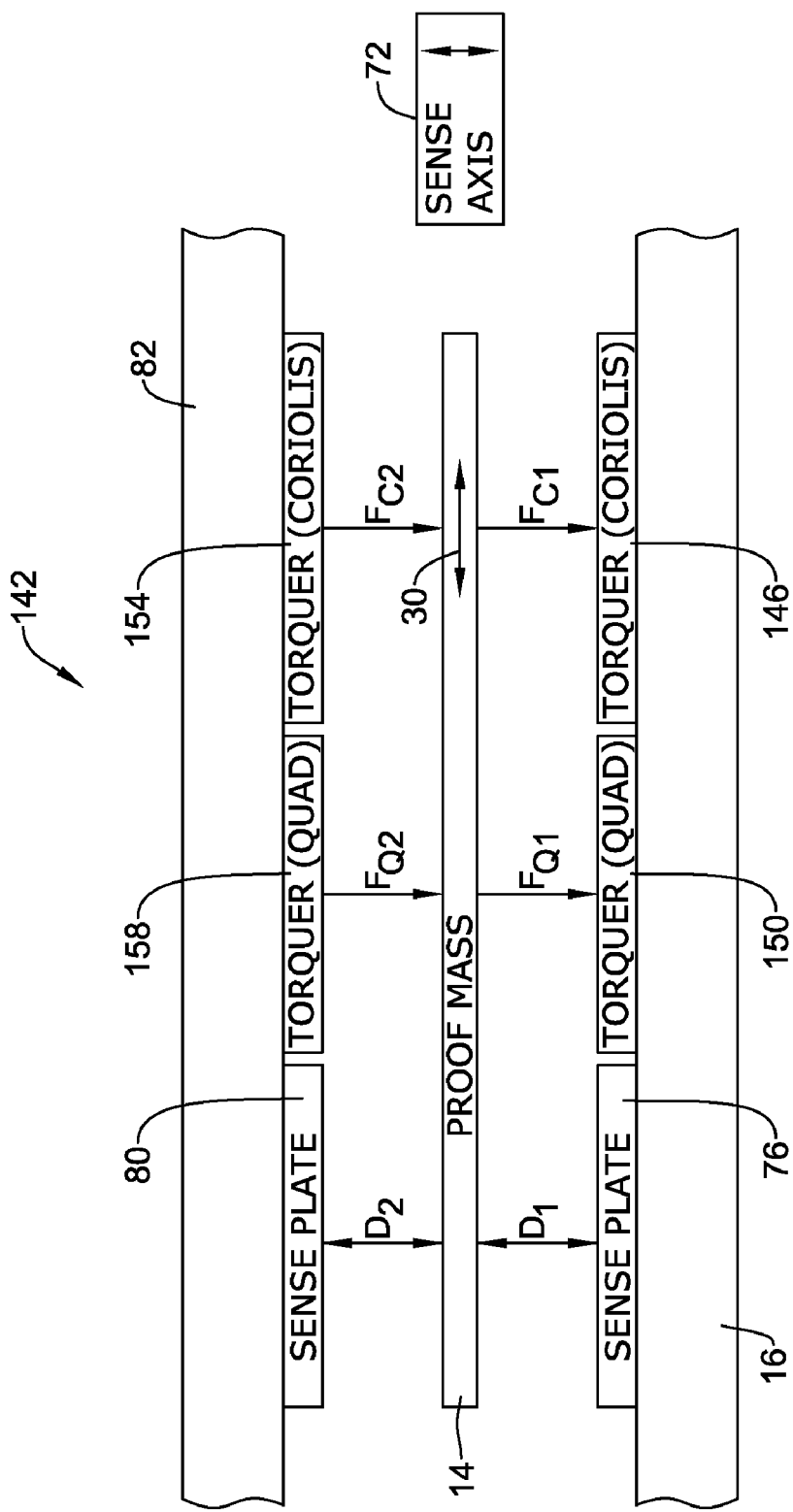
FIG. 6 is a side cross-sectional view showing the illustrative gyroscope along line 6-6 of FIG. 5.

FIG. 6 is a side cross-sectional view illustrating the operation of the sense electrodes and torquer electrodes of FIG. 5 in greater detail. As shown in FIG. 6, the first set of lower and upper torquer electrodes 146,154 can be positioned on or in the substrates 16,82 in a manner so as to produce electrostatic forces $F_{C1}, F_{C2}$ on the proof masses 12,14 that act to mechanically null any Coriolis-related proof mass motion along the sense axis 72. In similar fashion, the second set of lower and upper torquer electrodes 150,158 can be positioned on or in the substrates 16,82 in a manner so as to produce additional electrostatic forces $F_{Q1}, F_{Q2}$ on the proof masses 12,14 that act to mechanically null any quadrature-related proof mass motion along the sense axis 72.

Figure 7A:
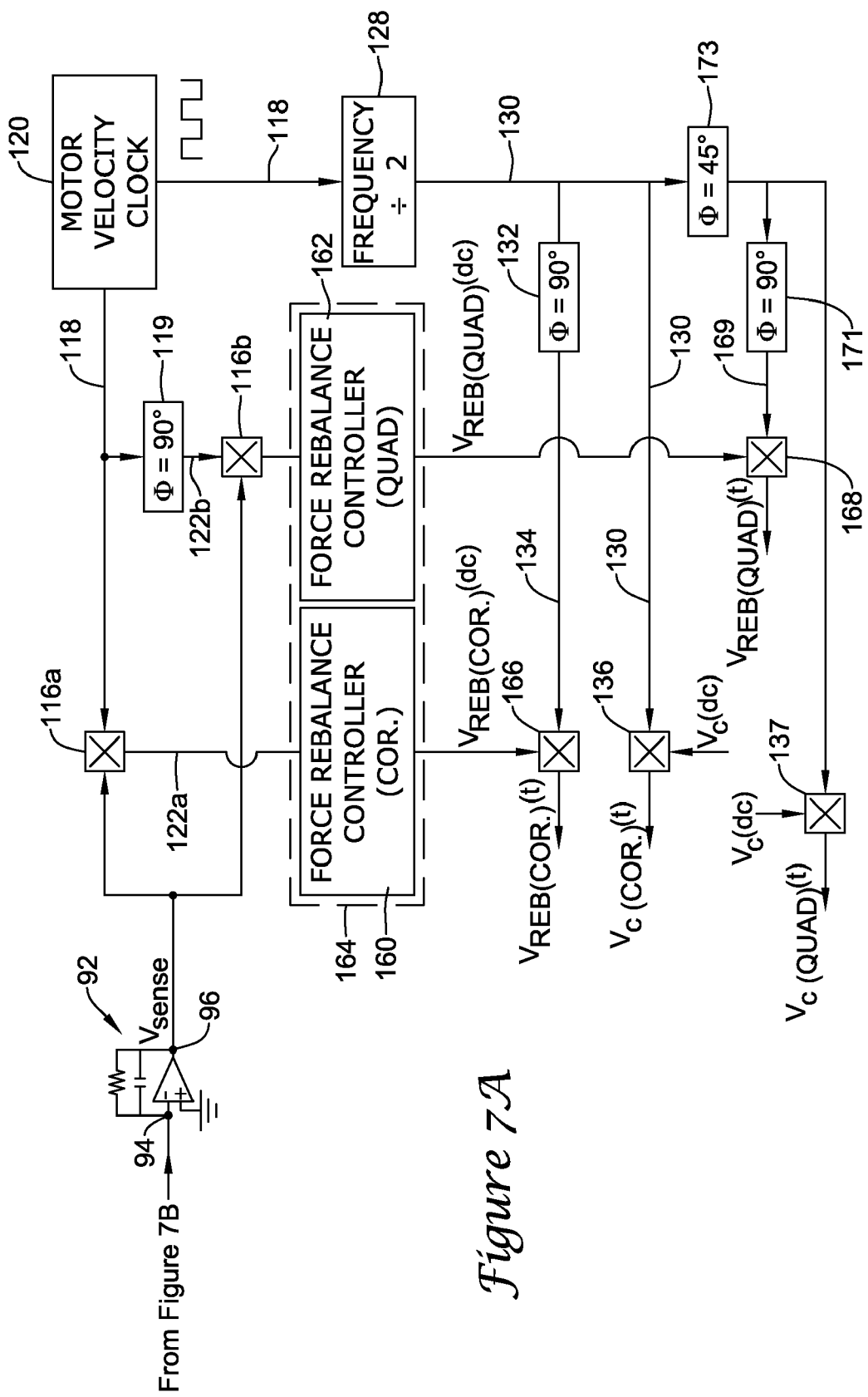
FIGS. 7A-7B is a representation of a simplified electromechanical block diagram showing the use of multiple force rebalancing control loops for controlling the MEMS gyroscope of FIGS. 5-6.
Figure 7B:
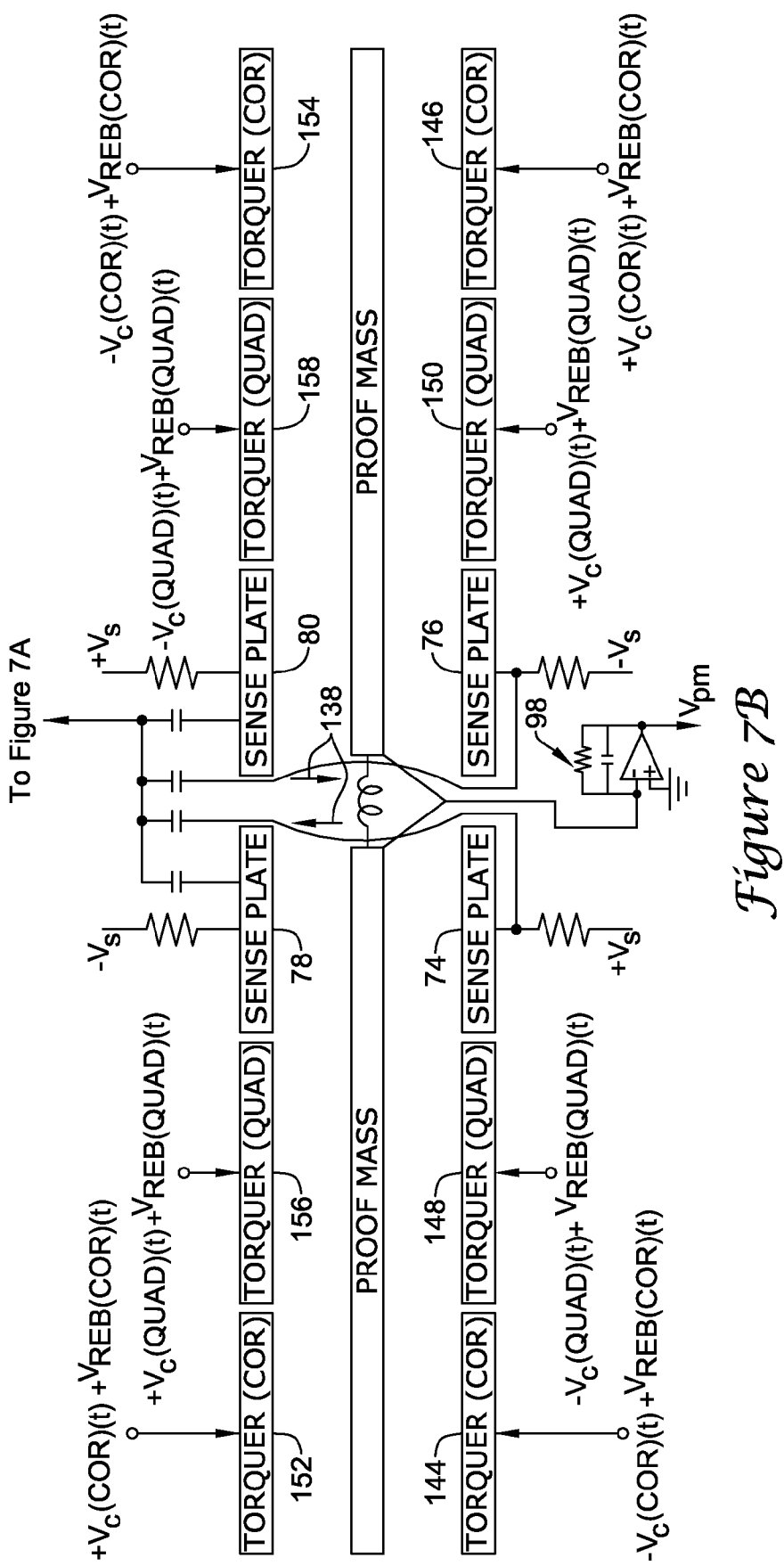

FIGS. 7A-7B represent a simplified electromechanical block diagram showing the use of multiple force rebalancing loops for controlling the MEMS gyroscope 142 of FIGS. 5-6. As shown in FIG. 7A, the output sense voltage $V_{sense}$ outputted from the charge amplifier 92 can be fed to a first demodulator 116a, which demodulates the sense voltage $V_{sense}$ with the output signal 118 from the drive motor velocity clock 120, producing a first voltage signal 122a. The sense voltage $V_{sense}$ outputted from the charge amplifier 92 can also be fed to a second demodulator 116b, which demodulates the output signal 118 from the drive motor velocity clock 120, producing a second voltage signal 122b. The second voltage signal 122a can be made 90° out-of-phase with the first signal 122a via a phase-shifter 119, as shown.

The first voltage signal 122a outputted from demodulator 116a can be fed to a first force rebalance controller 160 adapted to output a first DC rebalancing voltage $V_{REB(COR)}$(dc) that can be used by the gyroscope 142 to null any Coriolis-related proof mass motion. The second voltage signal 122b outputted from demodulator 116b, in turn, can be fed to a second force rebalance controller 162 adapted to output a second DC rebalancing voltage $V_{REB(QUAD)}$(dc) that can be used by the gyroscope 142 to null any quadrature-related proof mass motion. The first and second force rebalance controllers 160,162 can be implemented as either physically separate controllers, or can be combined into a single controller, as indicated generally by dashed box 164. In some embodiments, for example, a multiple-input multiple-output (MIMO) controller can be used to control both the quadrature and Coriolis rebalancing voltages $V_{REB(QUAD)}$(dc), $V_{REB(COR)}$(dc), if desired.

Once fed through various control logic within the force rebalance controllers 160,162, the first and second DC rebalancing voltages $V_{REB(COR)}$(dc), $V_{REB(QUAD)}$(dc) can each be fed to a corresponding mixer 166,168, which modulates the DC voltages to produce time-varying rebalancing voltages $V_{REB(COR)}$(t) and $V_{REB(QUAD)}$(t), respectively. The DC rebalancing voltage $V_{REB(COR)}$(dc), for example, can be mixed with phase adjusted signal 134 outputted by block 132, as shown. The DC rebalancing voltage $V_{REB(QUAD)}$(t), in turn, can be mixed with the output signal 169 from phase adjust block 171, as shown. A second phase shift at block 173 can offset the quadrature rebalancing voltage $V_{REB(COR)}$(t) by 45°, as further shown in FIG. 7A. The rebalancing voltages $V_{REB(COR)}$(t) and $V_{REB(QUAD)}$(t) can then each be combined with modulated carrier voltages $V_C$(t) produced at mixers 136 and 137, respectively, which can then applied to the various torquer electrodes as shown in FIG. 7B.

During operation, the application of the rebalancing voltages $V_{REB(COR)}$(t) and $V_{REB(QUAD)}$(t) on the torquer electrodes produces a number of time-varying electrostatic rebalancing forces on each of the proof masses 12,14 which act to constrain differential sense resonant mode motion 138 due to the Coriolis and quadrature forces. By employing multiple force rebalancing control loops, the gyroscope 142 can be configured to simultaneously null both the Coriolis and quadrature phases of proof mass motion along the sense axis 72.

Figure 8A:
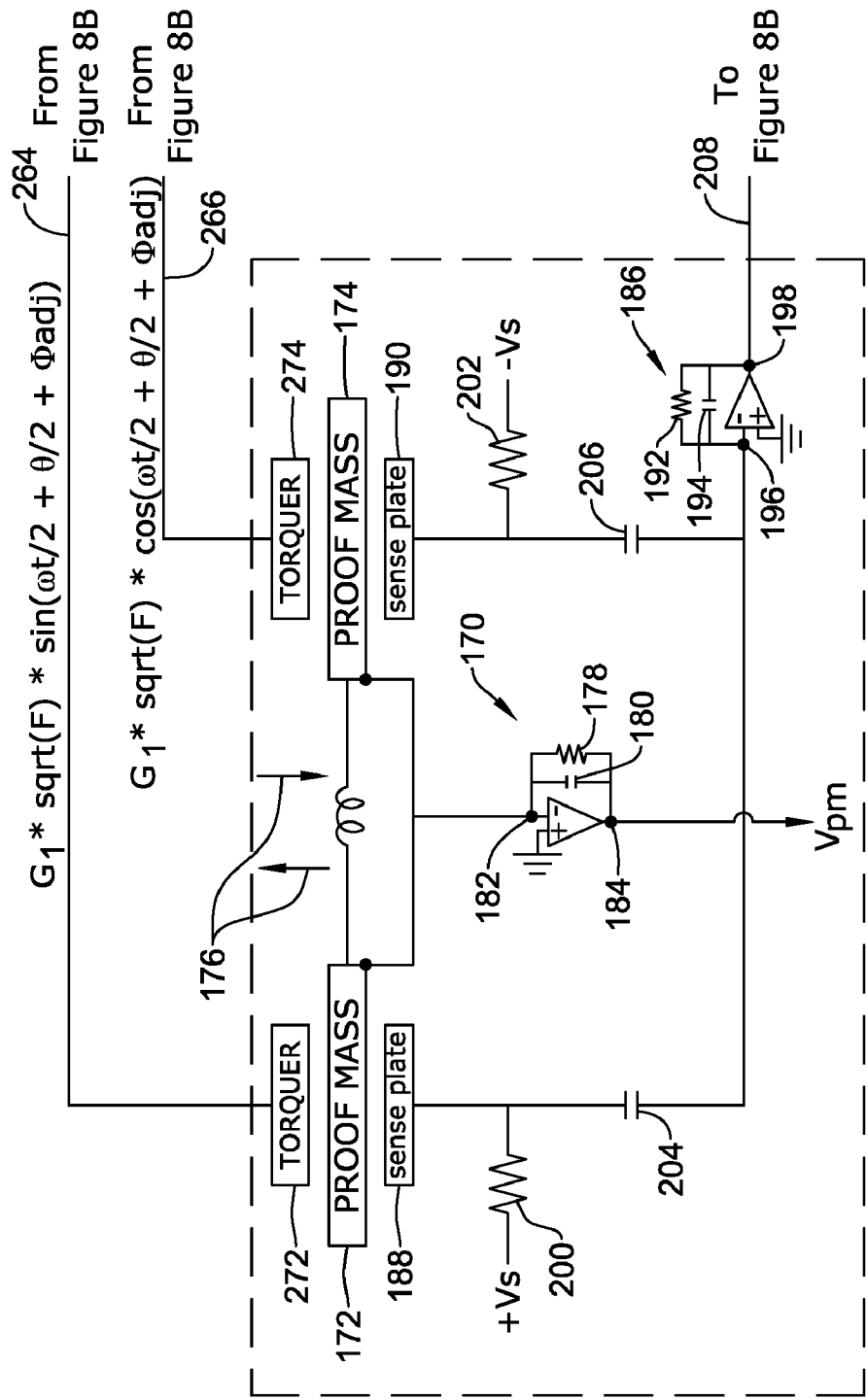
FIGS. 8A-8B is a representation of a simplified electromechanical block diagram showing another illustrative force rebalancing control loop for controlling a MEMS inertial sensor using sinusoidal rebalancing voltages applied to the torquer electrodes.
Figure 8B:
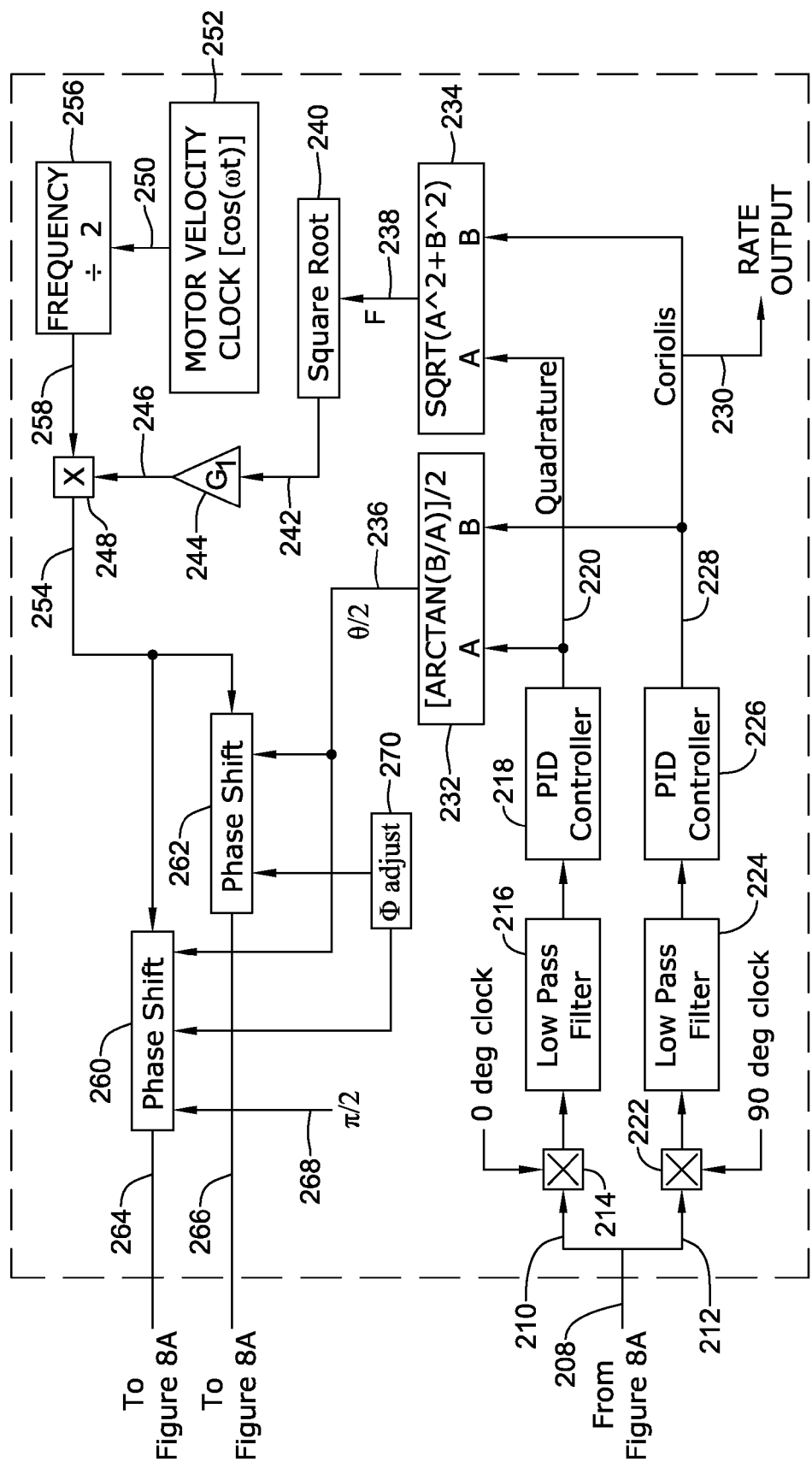

FIGS. 8A-8B represent a simplified electromechanical block diagram showing another illustrative force rebalancing control loop for controlling a MEMS inertial sensor similar to that depicted in FIGS. 1-2 using sinusoidal rebalancing voltages applied to the sense electrodes. As shown in FIG. 8A, the sense electronics for the inertial sensor can include a first amplifier 170 connected to each of the proof masses 172,174 of the inertial sensor and adapted to output a voltage signal $V_{PM}$ based on currents received from the proof masses 172, 174. The first amplifier 170 may comprise, for example, a charge amplifier having a large value resistor 178 and capacitor 180 connected across the input and output nodes 182,184 of the amplifier 170, which act to maintain the proof masses 172,174 at virtual ground.

The sense electronics for the inertial sensor can further include a second amplifier 186, which can be configured to amplify current signals received from a number of sense electrodes 188,190 due to out-of-plane movement of the proof masses 172,174 in the sense axis direction 176. The second amplifier 186 can comprise, for example, a charge amplifier having a relatively large value resistor 192 and capacitor 194 connected across the input and output nodes 196,198 of the amplifier 186.

A DC sense bias voltage $V_S$ applied to each of the sense electrodes 188,190 can be utilized to induce a charge on the proof masses 172,174 proportional to the capacitance between the respective sense electrode 188,190 and proof mass 172,174. To help balance the sense bias input to the second amplifier 186 at or about zero, the sense bias voltages $V_S$ applied to each sense electrode 188,190 can have an opposite polarity from each other, and can be connected to a respective resistor 200,202 and capacitor 204,206, as shown. In certain embodiments, for example, a sense bias voltage $V_S$ of +5V and −5V, respectively, can be applied to each of the sense electrodes 188,190 to ensure that the output signal from the second amplifier 186 is sensitive to only differential mode motion of the proof masses 172,174 along the sense axis 176.

FIG. 8B represents a simplified electromechanical block diagram showing the feedback control electronics (e.g. digital signal processing electronics) that can be used to force rebalance the proof masses 172,174 shown in FIG. 8A. As further shown in FIG. 8B, the amplified signals 208 received from the second amplifier 186 can be split into two separate signals 210,212 that are used by the control electronics to compensate for both the quadrature and Coriolis forces on the proof masses 172,174. A first signal 210 from the amplifier 186, for example, can be fed to a first demodulator 214, low-pass filter 216, and PID controller 218, producing a quadrature signal 220 that can be later used to compensate for quadrature-related motion of the proof masses 172,174. A second signal 212 from the amplifier 186, in turn, can be fed to a second demodulator 222, low-pass filter 224, and PID controller 226, producing a Coriolis signal 228 that can be later used to compensate for Coriolis-related motion of the proof masses 172,174, and which provides the desired rate output signal 230 of the inertial sensor. The second demodulator 222 can be configured to demodulate the second signals 212 from the amplifier 186 90° out-of-phase with the signals 210 fed to the first demodulator 214. In some embodiments, for example, the first demodulator 214 may demodulate amplified signal 210 using a sine wave function whereas the second demodulator 222 may demodulate amplified signal 212 using a cosine function.

Once the amplified signals 210,212 are modulated, filtered, and the compensated, the resultant signals 220,228 can then be passed through a number of function routines 232,234, which process the two signals 220,228 to form a respective signal 236 and 238. A first function routine 232, for example, can be configured to determine the phase of the quadrature and Coriolis-related signals 220,228, producing an output signal 236 having a phase that is half (i.e. θ/2) that of the output signal 208 from the second amplifier 186. In some embodiments, the first function routine 232 can determine the phase based on the following expression:

$$\arctan\left(\frac{B}{A}\right)/2; \qquad (3)$$

where:
"B" is the Coriolis-related signal 228; and
"A" is the quadrature-related signal 220.

The second function routine 234, in turn, can be configured to determine the amplitude of the electrostatic rebalancing force F necessary to cancel the quadrature and Coriolis-related motions of the proof masses 172,174. In one such embodiment, for example, the second function routine 234 can be configured to determine the amplitude of the electrostatic force F based on the following expression:

$$\sqrt{A^2+B^2}; \qquad (4)$$

where:
"B" is the Coriolis-related signal 228; and
"A" is the quadrature-related signal 220.

The electrostatic force F determined from expression (4) above can then be fed to box 240, which takes the square root of the electrostatic force F. The resultant force signal 242 is then gain adjusted with a constant $G_1$ at box 244. The gain adjusted force signal 246 can then be fed to a mixer 248, which modulates the adjusted signal 246 with the clock signal 250 produced by the motor velocity clock 252 to produce a time-varying rebalancing voltage signal 254. To disassociate the rebalancing voltage signal 254 from the motor velocity clock signal 250, the angular frequency (ω) of the motor velocity signal 250 can be reduced by a scale factor of 2 using a frequency divider 256, thus outputting a signal 258 having a frequency half that of the motor velocity clock signal 250.

The rebalancing voltage signal 254 outputted from the mixer 248 can then be split and fed to a number of phase-shifters 260,262, which produce rebalancing voltage signals 264,266 that are 90° out-of-phase with each other. The component of the rebalancing voltage signal 254 fed to the first phase shifter 260, for example, can be phase shifted 90° (i.e. π/2) via signal 268, and has a frequency matching that of half the motor frequency ω via signal 236. The component of the rebalancing voltage signal 254 fed to the second phase shifter 262, in turn, is maintained 90° out-of-phase with the first rebalancing signal 264, and also has a frequency matching that of half the motor frequency ω via signal 236. In some embodiments, a phase adjuster 270 can be used to adjust the phase provided by the first and/or second phase shifters 260, 262, if desired.

As can be further seen by reference back to FIG. 8A, the time-varying rebalancing voltage signals 264,266 are then fed to a respective torquer electrode 272,274 in order to electrostatically null the Coriolis and quadrature forces on the proof masses 172,174. The first rebalancing voltage signal 264, for example, can be applied to a first torquer electrode 272 for canceling the Coriolis and quadrature forces on proof mass 172. The second rebalancing voltage signal 264, in turn, can be applied to a second torquer electrode 274 for canceling the Coriolis and quadrature forces on proof mass 174. By proper adjustment of the phases of the rebalancing voltage signals 264,266, these signals simultaneously control both the Coriolis and quadrature-related motions of the proof masses 12,14. Since the rebalancing voltage signals 264,266 fed to each corresponding electrode 272,274 are sinusoidal rebalancing voltages at half the motor frequency and 90° out-of-phase with each other and the electrostatic force is proportional to the square of the applied voltage, the resulting forces on the proof masses 172,174 are at the motor frequency and 180° out-of-phase with each other. Thus, the electrostatic rebalancing forces are able to null the differential motion of the proof masses 172,174 (i.e. the Coriolis and quadrature-related motions) at the motor frequency.

Figure 9A:
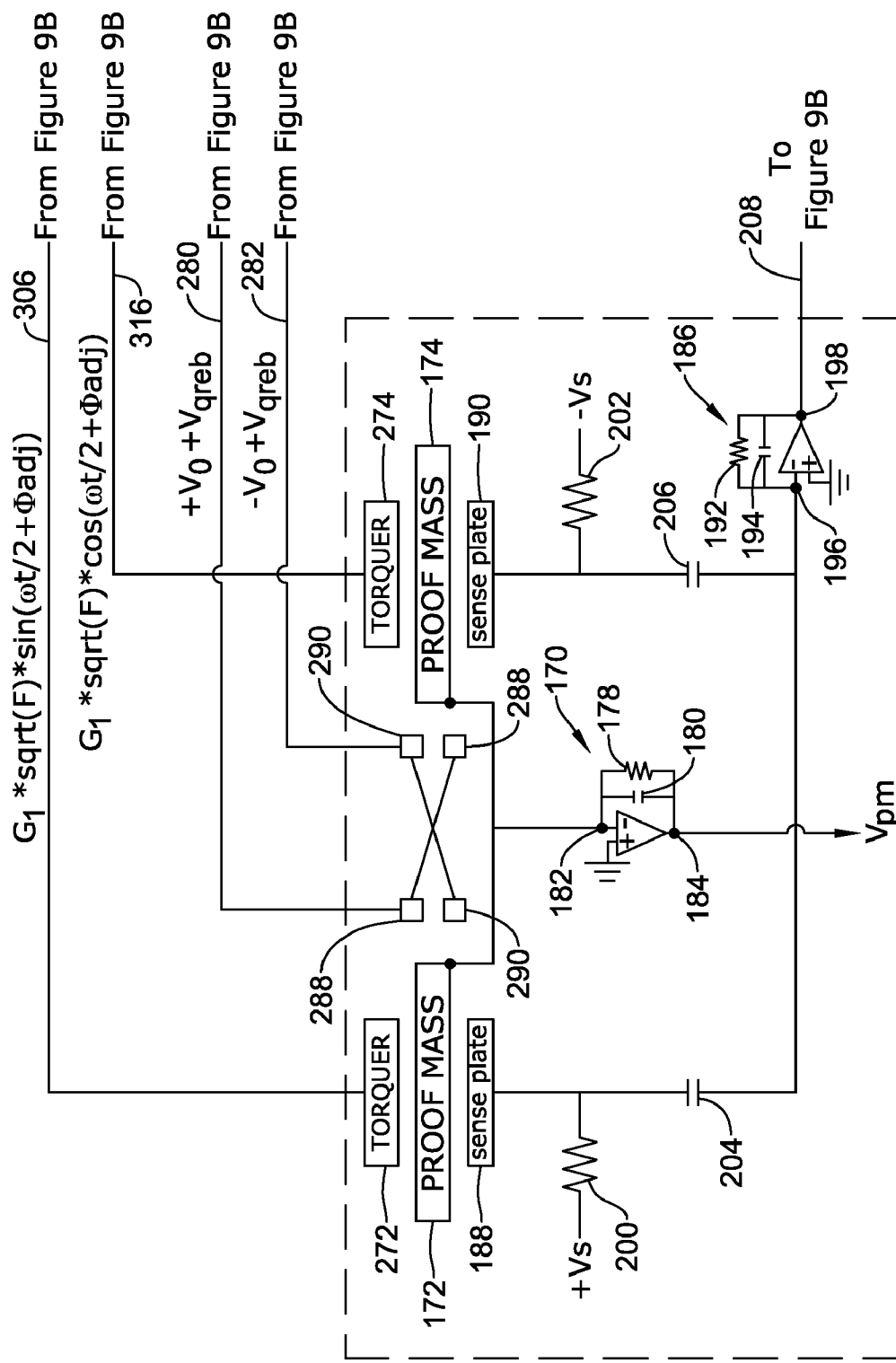
FIGS. 9A-9B is a representation of a simplified electromechanical block diagram showing the use of multiple force rebalancing control loops for controlling a MEMS inertial sensor using separate sinusoidal Coriolis and DC quadrature rebalancing voltages.
Figure 9B:
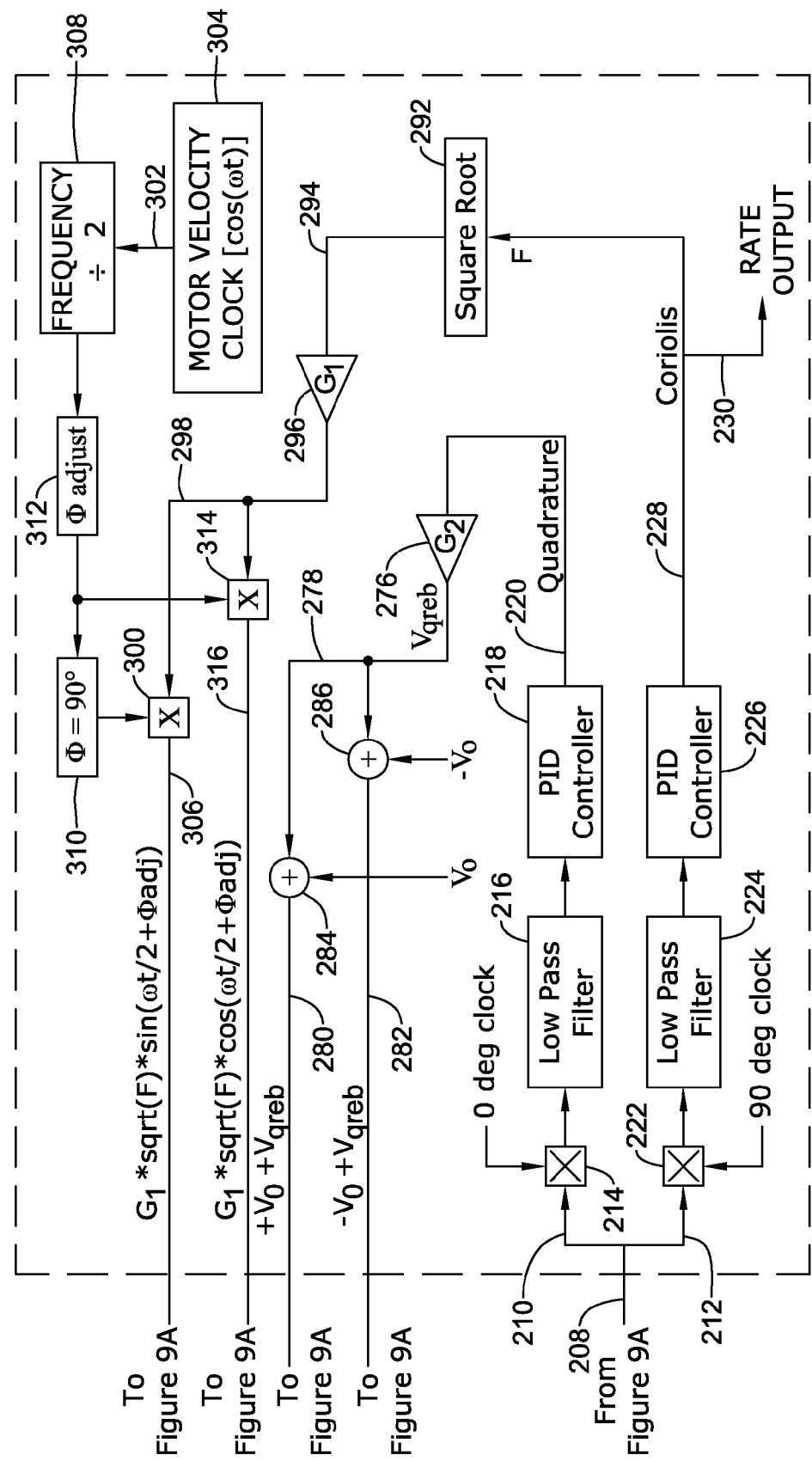

FIGS. 9A-9B represent a simplified electromechanical block diagram showing the use of multiple force rebalancing control loops for controlling a MEMS inertial sensor using separate sinusoidal Coriolis and quadrature rebalancing voltages. As shown in FIGS. 9A-9B, the sense electronics for the inertial sensor are similar to that depicted in FIGS. 8A-8B, with like elements labeled in like fashion.

In the illustrative embodiment of FIGS. 9A-9B, however, the quadrature and Coriolis-related signals 220,228 outputted from the PID controllers 218,226 are part of separate control loops, allowing the electronics to compensate for quadrature and Coriolis forces independently of each other. The quadrature signal 220 outputted from the PID controller 218 used to compensate for quadrature-related proof mass motion, for example, can be fed to its own gain adjuster 276, which adjusts the signal 220 by a constant $G_2$. The quadrature rebalancing voltage 278 outputted by gain adjuster 276 can then be split into two separate DC quadrature rebalancing signals 280,282 after adding bias voltage $V_0$ and $-V_0$ via adders 284,286, respectively. As can be seen by reference back to FIG. 9A, the quadrature rebalancing signals 280,282 can then be applied to a number of torquer electrodes 288,290 for electrostatically nulling any quadrature related motion of the proof mass 172,174. In an in-plane gyroscope (IPG) configuration, for example, the torquer electrodes 288,290 can be placed above and below the proof masses 172,174 to electrostatically null quadrature related proof mass motion. Alternatively, in other configurations such as an out-of-plane gyroscope (OPG), the torquer electrodes 288,290 could be placed at other locations such as between the pickoff comb electrodes and/or drive comb electrodes.

As further shown in FIG. 9B, the Coriolis-related signal 228 outputted by the PID controller 226 used to compensate for Coriolis-related proof mass motion can be fed to box 292, which takes the square root of signal 228. The resulting signal 294 is then fed to a gain adjuster 296, which adjusts the gain with a constant $G_1$. The gain adjusted signal 298 can then be split and fed to a first mixer 300, which modulates the adjusted signal 298 with the clock signal 302 produced by the motor velocity clock 304 to produce a time-varying rebalancing voltage signal 306. The frequency of the rebalancing voltage signal 306 can be reduced by a scale factor of 2 using a frequency divider 308. The rebalancing voltage signal 306 can also be phase shifted by 90° using a phase shifter 310. In some embodiments, a second phase shifter 312 can be provided to vary the phase of the rebalancing voltage signal 306, if desired.

The gain adjusted signal 298 can be further fed to a second mixer 314, which modulates the signal 298 with the clock signal 302 produced by the motor velocity clock 304 to produce a second time-varying rebalancing voltage signal 316 that is 90° out-of-phase with the time-varying rebalancing voltage signal 306 outputted by the first mixer 300. If necessary, the phase adjuster 312 can be used to adjust the phase of the second time-varying rebalancing voltage signal 316. As further shown in FIG. 9A, the time-varying rebalancing voltage signals 306,316 are then fed to a respective torquer electrode 272,274 in order to electrostatically null the Coriolis forces on the proof masses 172,174.

Figure 10:
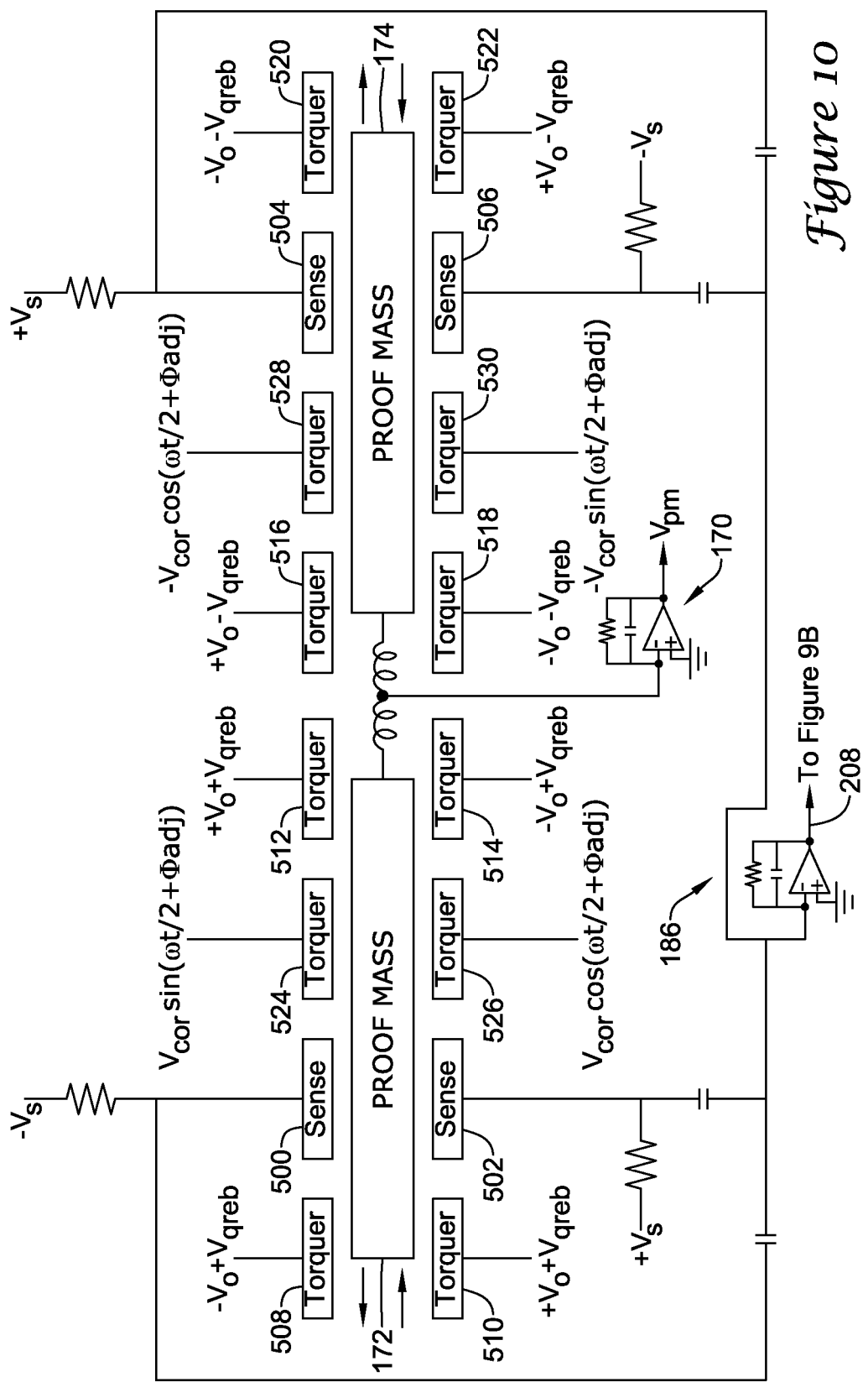
FIG. 10 is a side-cross-sectional view showing an illustrative sense and torquer electrode configuration for the MEMS inertial sensor of FIGS. 9A-9B.

FIG. 10 is a side cross-sectional view showing an illustrative sense and torquer electrode configuration for the MEMS inertial sensor of FIGS. 9A-9B. In an in-plane gyroscope configuration depicted in FIG. 10, the sense electrodes 500, 502,504,506 used for sensing motion of the proof masses 171,174 along the sense axis of the inertial sensor can be positioned both above and below each corresponding proof mass 172,174. For example, with respect to the first proof mass 172, an upper sense electrode 500 and lower sense electrode 502 each charged with opposite sense bias voltages $+V_S$ and $-V_S$, respectively, can be used to sense motion of the first proof mass 172 along the sense axis. In similar fashion, an upper sense electrode 504 and lower sense electrode 506 each charged with opposite sense bias voltages $-V_S$ and $+V_S$, respectively, can be used to sense motion of the second proof mass 174 along the sense axis.

In the illustrative embodiment of FIG. 10, two sets of upper and lower torquer electrodes can be provided for each respective proof mass 172,174 to null quadrature-related motion of the proof masses 172,174. With respect to the first proof mass 172, for example, a first set of upper and lower torquer electrodes 508,510 can be used to null quadrature-related motion during movement of the proof mass 172 in one direction along the drive axis whereas a second set of upper and lower torquer electrodes 512,514 can be used to null quadrature-related motion during movement of the proof mass 172 in the opposite direction. Similarly, a first set of upper and lower torquer electrodes 516,518 can be used to null quadrature-related motion during movement of the second proof mass 174 in one direction along the drive axis whereas a second set of upper and lower torquer electrodes 520,522 can be used to null quadrature-related motion during movement of the proof mass 174 in the opposite direction. Although two sets of torquer electrodes are shown for each proof mass 172,174, it should be understood that other numbers and/or configurations could be employed. In addition, the voltages applied to each of the torquer electrodes can also be varied from that depicted in FIG. 10.

A set of upper and lower torquer electrodes can be further provided for each proof mass 172,174 to null Coriolis-related motion of the proof masses 172,174 along the sense axis. With respect to the first proof mass 172, for example, an upper torquer electrode 524 and lower torquer electrode 526 can be used to null Coriolis-related motion of the proof mass 172 along the sense axis direction. In similar fashion, an upper torquer electrode 528 and lower torquer electrode 530 can be used to null Coriolis-related motion of the second proof mass 174 along the sense axis direction. The number and configuration of the torquer electrodes, including the voltages applied to the electrodes, can be varied from that depicted in FIG. 10.

Although MEMS-type in-plane gyroscopes (IPG's) are specifically depicted in the illustrative embodiments described herein, it should be understood that other types of inertial sensing devices can employ one or more features described herein. In certain embodiments, for example, the torquer electrodes and AC rebalancing forces could be utilized in conjunction with a MEMS-type out-of-plane gyroscope (OPG) such as that described in U.S. Pat. No. 7,036, 373, entitled "MEMS Gyroscope With Horizontally Oriented Drive Electrodes," the contents of which are incorporated herein by reference in their entirety. In an out-of-plane gyroscope embodiment, the torquer electrodes can be configured to provide lateral electrostatic forces on the proof masses that can be used to null any motion along the sense axis due to the Coriolis and/or quadrature forces. As with an in-plane gyroscope, the output of the out-of-plane gyroscope is the rebalancing voltage used to provide the necessary feedback force to null the Coriolis and/or quadrature forces rather than the voltage induced by proof mass displacement.

Figure 11A:
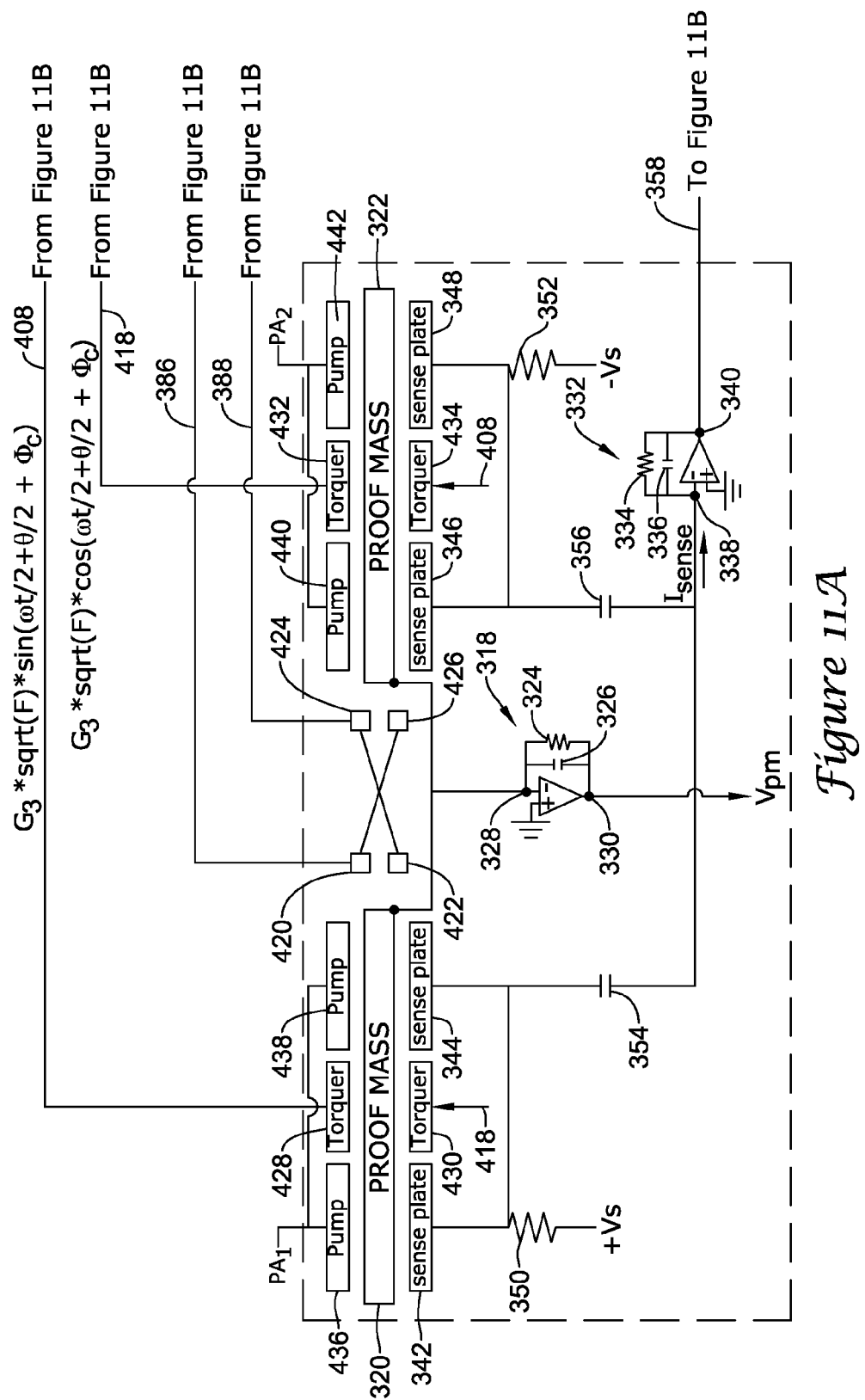
FIG. 11A-11B is a representation of a simplified electromechanical block diagram showing the use of both force rebalancing and parametric gain amplification for controlling a MEMS inertial sensor.
Figure 11B:
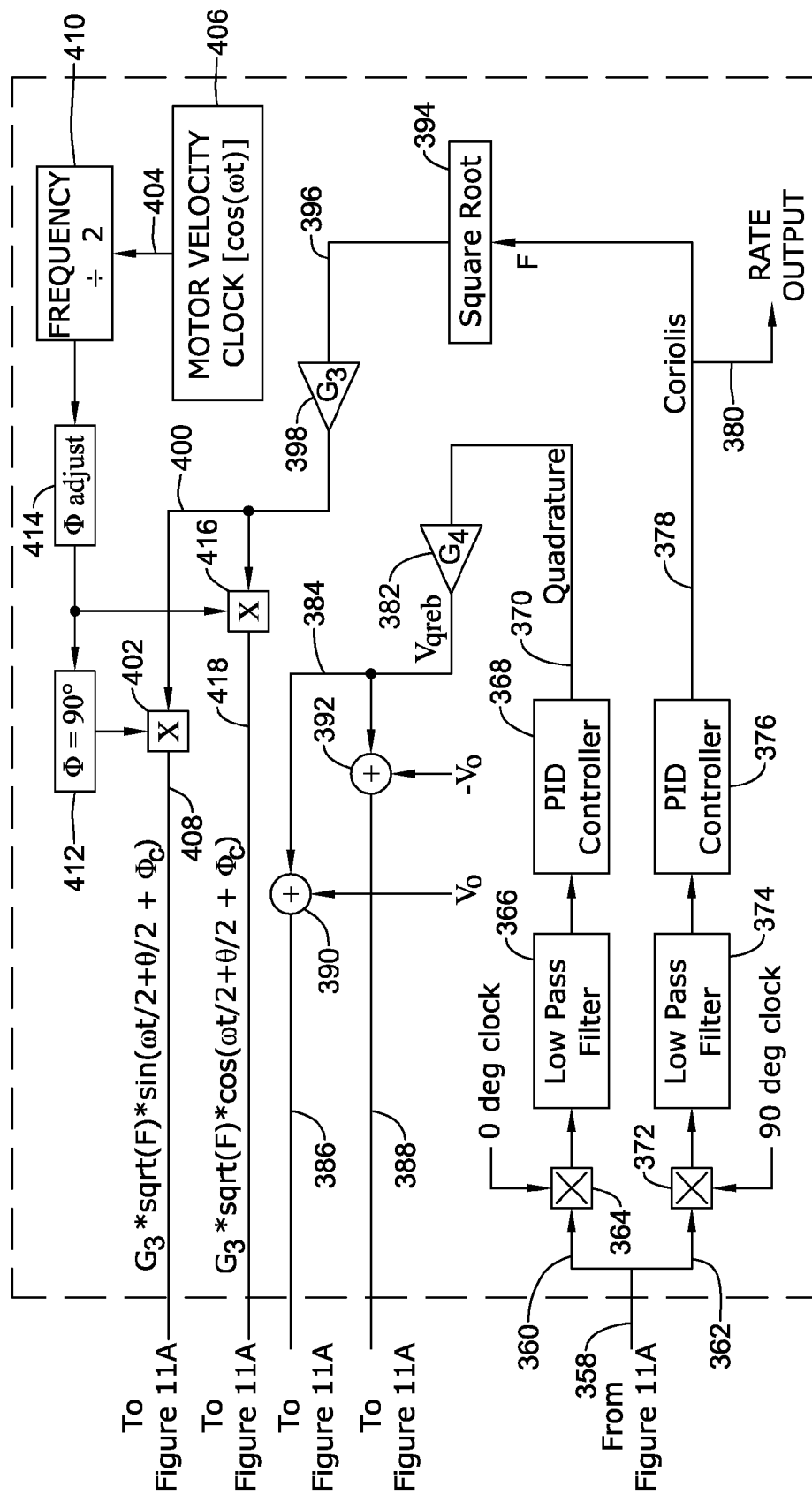

Referring now to FIGS. 11A-11B, a simplified electromechanical block diagram showing the use of both force rebalancing and parametric gain amplification for controlling a MEMS inertial sensor will now be described. The sense and force rebalancing electronics for the inertial sensor are similar to that described with respect to FIGS. 9A-9B, including, for example, a first amplifier 318 connected to each of the proof masses 320,322 of the inertial sensor and adapted to output a voltage signal $V_{PM}$ based on currents received from the proof masses 320,322. The first amplifier 318 may comprise, for example, a charge amplifier having a large value resistor 324 and capacitor 326 connected across the input and output nodes 328,330 of the amplifier 318, which act to maintain the proof masses 320,322 at virtual ground. A second amplifier 332 (e.g. a charge amplifier) having a large value resistor 334 and capacitor 336 connected across the input and output nodes 338,340 of the amplifier 332, in turn, can be provided to amplify current signals received from a first set of sense electrodes 342,344 adjacent to proof mass 320 and a second set of sense electrodes 346,348 adjacent to proof mass 322.

A DC sense bias voltage $V_S$ applied to each of the sense electrodes 342,344,346,348 can be utilized to induce a charge on the proof masses 320,322 proportional to the capacitance between each respective set of sense electrodes 342,344,346, 348 and correspondingly adjacent proof mass 320,322. The sense bias voltages $V_S$ applied to the sense electrodes of the two proof masses can have an opposite polarity from each other so that the output of the second amplifier 332 is sensitive only to differential sense-axis motion of the two proof masses, i.e. the type of motion produced by Coriolis forces. The capacitors 354,356 and resistors 350,352 allow time-varying signals from all sense electrodes to be applied to the input of amplifier 332 while maintaining separate DC sense bias voltages on the sense electrodes of the two proof masses.

FIG. 11B represents a simplified electromechanical block diagram showing the feedback control electronics that can be used to force rebalance the proof masses 320,322 shown in FIG. 11A. As further shown in FIG. 11B, the amplified signals 358 received from the second amplifier 332 can be split into two separate signals 360,362 that can be used by the control electronics to compensate for both quadrature and Coriolis forces on the proof masses 320,322. A first signal 360 from the amplifier 332, for example, can be fed to a first demodulator 364, low-pass filter 366, and PID controller 368, producing a quadrature signal 370 that can be later used to compensate for quadrature-related motion of the proof masses. A second signal 362 from the amplifier 332, in turn, can be fed to a second demodulator 372, low-pass filter 374, and PID controller 376, producing a Coriolis signal 378 that can be used to compensate for Coriolis-related motion of the proof masses 320,322, and which provides the desired rate output signal 380 of the inertial sensor. The second demodulator 372 can be configured to demodulate the second signals 362 from the amplifier 332 90° out-of-phase with the first signals 360 received from the amplifier 332.

The quadrature-related signal 370 outputted from the PID controller 368 used to compensate for quadrature-related proof mass motion can be fed to a gain adjustor 382, which adjusts the signal 370 by a constant $G_4$. The quadrature rebalancing voltage 384 outputted by gain adjustor 382 (i.e. $V_{qreb}$) can then be split into two separate DC quadrature rebalancing signals 386,388 after adding bias voltage $V_0$ and $-V_0$ via adders 390,392, respectively.

The Coriolis-related signal 378 outputted by the PID controller 376 used to compensate for Coriolis-related proof mass motion can be fed to box 394, which takes the square root of signal 378. The resulting signal 396 is then fed to a gain adjuster 398, which adjusts the gain with a constant $G_3$. The gain adjusted signal 400 can then be split and fed to a first mixer 402, which modulates the adjusted signal 400 with the clock signal 404 produced by the motor velocity clock 406 to produce a time-varying rebalancing voltage signal 408. The frequency of the rebalancing voltage signal 408 is reduced by a scale factor of 2 using a frequency divider 410. The rebalancing voltage signal 408 can also be phase shifted by 90° using a phase shifter 412. In some embodiments, a second phase shifter 414 can be provided to vary the phase of the rebalancing voltage signal 408, if desired.

The gain adjusted signal 400 can be further fed to a second mixer 416, which modulates the signal 400 with the clock signal 404 produced by the motor velocity clock 406 to produce a second time-varying rebalancing voltage signal 418 that is 90° out-of-phase with the time-varying rebalancing voltage signal 408 outputted by the first mixer 402. If necessary, the phase adjuster 414 can be used to adjust the phase of the second time-varying rebalancing voltage signal 418.

Referring back to FIG. 11A, the DC quadrature rebalancing signals 386,388 outputted by the feedback control electronics can be applied to a number of torquer electrodes 420,422,424,426 for electrostatically nulling any quadrature-related motion of the proof masses 320,322. The time-varying rebalancing signals 408,418, in turn, can be fed to a number of torquer electrodes 428,430,432,434 in order to electrostatically null the Coriolis forces on the proof masses 320,322. The phase of the Coriolis-related rebalancing voltages applied to each proof mass 320,322 can be offset 90° from each other such that the rebalancing forces applied to each proof mass 320,322 act together to mechanically null proof mass motion along the sense axis. With respect to proof mass 320, for example, the phase of the rebalancing voltage signal 408 applied to an upper torquer electrode 428 used to null Coriolis-related motion is offset 90° from the rebalancing voltage signal 418 applied to a lower torquer electrode 430 used to null Coriolis-related motion.

As can be further seen in FIG. 11A, the MEMS inertial sensor can further include a number of pump electrodes 436, 438,440,442 that can be used to produce a pumping force on the proof masses 320,322 for amplifying the Coriolis-related motion and suppressing quadrature-related motion of proof masses 320,322 along the sense axis. A first set of pump electrodes 436,438 adjacent to proof mass 320, for example, can be configured to receive a first parametric amplification voltage signal $PA_1$, which acts to increase the combined mechanical and electrical gain resulting from Coriolis forces acting on the proof mass 320 along the sense axis. In similar fashion, a second set of pump electrodes 440,442 adjacent to proof mass 322 can be configured to receive a second parametric amplification voltage signal $PA_2$, which likewise acts to increase the combined mechanical and electrical gain resulting from Coriolis forces acting on the proof mass 322 along the sense axis. As with the sense electrodes 342,344, 346,348 and force-rebalancing torquer electrodes 428,430, 432,434, the parametric amplification pump electrodes 436, 438,440,442 can each include a thin, rectangular-shaped electrode plate positioned above and/or below at least a portion of the proof masses 320,322. The configuration of the pump electrodes 436,438,440,442 may vary from that shown schematically in FIG. 11A depending on the type and/or configuration of the inertial sensor. For example, for an out-of-plane MEMS gyroscope, the pump electrodes could include interdigitated comb fingers.

The first and second parametric amplification voltage signals $PA_1$, $PA_2$ are time-varying and oscillate at approximately twice the motor resonant frequency (i.e. $2\omega$) of the proof masses 320,322, which, in turn, causes the effective mechanical spring constant of the proof masses 320,322 to each oscillate at twice the motor frequency with opposite oscillatory phases. In some embodiments, the first and second parametric amplification voltage signals $PA_1,PA_2$ can each comprise a DC bias voltage component $V_b$ and an AC pump signal component $V_p \cos(2\omega t+\phi)$, where $\omega$ is the motor mode frequency and $\phi$ is the phase angle of the AC pump signal component. In some embodiments, the first and second parametric amplification voltage signals $PA_1,PA_2$ can each be expressed generally by the following equations:

$$PA_1 = +V_b + V_P^* \cos(2\omega t+\phi); \text{ and} \qquad (5)$$

$$PA_2 = -V_b - V_P^* \cos(2\omega t+\phi). \qquad (6)$$

As can be seen from the above Equations (5) and (6), the AC pump signal component $V_p \cos(2\omega t+\phi)$ for the parametric amplification voltage signals $PA_1,PA_2$ can be added to or subtracted from the DC bias voltage component $V_b$, either enhancing or suppressing the sensor output signal depending on the relative phases of the AC pump signal component and the sense pickoff output signal. During operation, the AC pump voltage component $V_p \cos(2\omega t+\phi)$ modulates the resonant frequency of the sense mode, producing non-linear mixing between the electrostatic pump force provided by the pump electrodes 436,438,440,442 and the input mechanical force applied along the sense axis, producing a force at the difference frequency between the pump and input forces. This difference frequency is equal to the frequency of the input force (i.e. the motor frequency $\omega$) so that it either adds or subtracts from the input force, producing either amplification or attenuation depending on the relative phases of the input and pump forces. The inertial sensor thus acts as a parametric amplifier with the mechanical gain dependent on the phase angles of the input driving force and the pump voltage. By selecting the phase angle φ of the pump voltage signals $PA_1$, $PA_2$, the Coriolis input force can be amplified and the quadrature-phase input force attenuated, as desired.

The mechanical gain resulting from the application of the pump voltages to the pump electrodes 436,438,440,442 can be calculated from the equation of motion for the sense mode displacement of the proof masses 320,322 as follows:

$$m\frac{d^2y}{dt^2} + \gamma\frac{dy}{dt} + \left[k_0 - \frac{1}{2}\left(\frac{\partial^2 C_p}{\partial y^2}\right)_{y=0}(V_b + V_p\cos(2\omega t + \phi))^2\right]y = \qquad (7)$$

$$F\cos(\omega t + \psi);$$

where:
$y=(y_1-y_2)/2$ is the sense mode displacement, where $y_1$ and $y_2$ are the sense-axis displacements of the two proof masses;
m=mass of one proof mass;
γ=damping constant;
$k_o$=spring constant for the sense mode, including negative electrostatic spring constants for all electrodes except the pump electrodes;
$C_p$=capacitance of one pump electrode;
$V_b$=DC bias voltage;
$V_p$=amplitude of parametric pump voltage;
ω=motor frequency;
φ=phase of pump voltage;
F=input mechanical force on the sense mode (i.e. differential force on the proof masses along the sense axis); and
ψ=phase of the input mechanical force.

In the above Equation (7), the quantity within the brackets represents the time-varying spring constant for the sense mode of the proof mass 320,322 having a component at two-times the motor frequency (i.e. 2ω) that is proportional to the pump voltage $V_p$. From the above, it can thus be seen that non-linear mixing arises from the product of the 2ω component of the spring constant and the ω frequency component of the y sense mode displacement.

When parametric amplification is used in conjunction with force rebalancing, an increase in mechanical gain occurs even when the proof masses 320,322 are held stationary along the sense-axis direction since the parametric amplification gain factor depends on the modulation of the electrostatic spring constant of the inertial sensor and not the actual movement of the proof masses along the sense axis. During force rebalance operation, the parametric gain increases the sensitivity of the sensor output to small deviations of the proof mass from the null position. As a result, the contribution of the electronics noise to the closed loop output noise is reduced. In some embodiments, the determination of the sense mode displacement y(t) in Equation (7) above can be accomplished in a manner similar to that described in U.S. Pat. No. 6,715,353, entitled "MEMS Gyroscope With Parametric Gain", the contents of which are incorporated herein by reference in their entirety.

Figure 12:
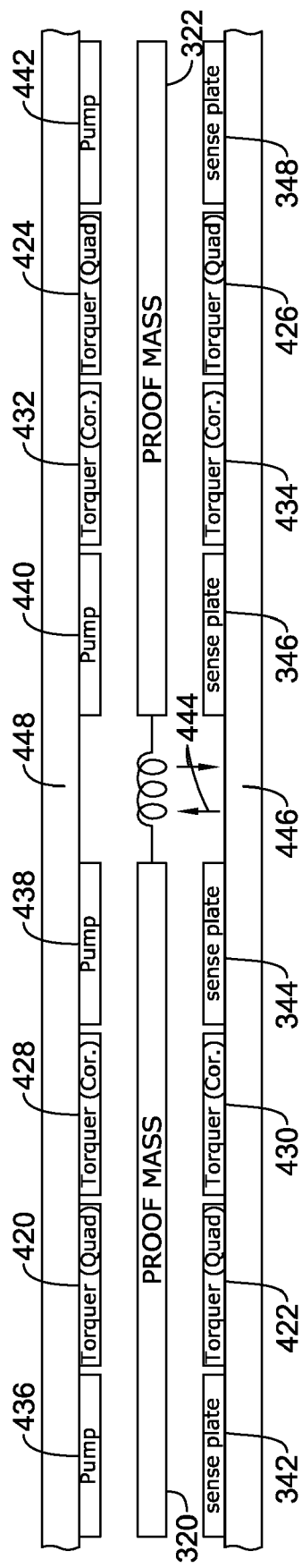
FIG. 12 is a side cross-sectional view showing an illustrative configuration of sense, torquer, and pump electrodes for the MEMS inertial sensor of FIG. 11A-11B.

When parametric amplification is used with force rebalance, separate electrodes for parametric pumping and proof mass position sensing may be used, as shown in the configurations of FIGS. 11 and 12. In these configurations, the electrical sensing of the proof mass position is not affected by the parametric pump voltage. As a result, the parametric amplification and the proof mass position sensing can be designed independently for improved performance of these two functions.

Because the parametric amplification of the inertial sensor occurs without any significant addition of noise, the angle random walk (ARW) can also be improved over more conventional inertial sensors where parametric amplification is not employed. In addition, suppression of the quadrature output signal via parametric amplification can reduce sensor bias and increase bias stability, further increasing the ability of the sensor to accurately detect rate.

The layout of the various sense, torquer, and pump electrodes in FIG. 11A can be varied depending on the configuration of the inertial sensor such as the location of the sense electrodes, the quadrature force-rebalancing torquer electrodes, the Coriolis force-rebalancing torquer electrodes, the pickoff electrodes, as well as other components. In those embodiments in which the inertial sensor is an in-plane gyroscope (IPG), for example, the torquer and pump electrodes used for parametric amplification can be arranged adjacent to the sense electrodes or on the opposite side of the proof masses from the sense electrodes. In other configurations such as an out-of-plane gyroscope (OPG), the sense, torquer, and pump electrodes can be arranged to provide electrostatic forces along the positive or negative sense axis direction. In order to reduce vibration and improve g-sensitivity, the sense, torquer, and pump electrodes will typically be symmetrically arranged along the sense axis adjacent the proof masses, although other configurations are possible.

FIG. 12 is a side cross-sectional view showing an illustrative sense and torquer electrode configuration for the MEMS inertial sensor of FIGS. 11A-11B. In an in-plane gyroscope (IPG) depicted in FIG. 12, the sense electrodes 342,344,346, 348 used for sensing motion of the proof masses 320,322 along the sense axis 444 of the inertial sensor can be positioned on or in a lower substrate 446 located adjacent to each of the proof masses 320,322. The pump electrodes 436,438, 440,442 used to electrostatically apply pump voltages for parametrically amplifying proof mass motion along the sense axis 444, in turn, can be positioned on or in an upper substrate 448 of the inertial sensor opposite the sense electrodes 342, 344,346,348, as shown.

In the illustrative embodiment of FIG. 12, separate quadrature and Coriolis torquer electrodes are provided for separately nulling the quadrature and Coriolis-related motions of the proof masses 320,322, similar to that described above with respect to FIG. 9. Alternatively, and in other embodiments, each of the force rebalancing torquer electrodes can be configured to electrostatically null both quadrature and Coriolis-related proof mass motion, similar to that described above with respect to FIG. 8. The torquer electrodes 420,422, 424,426 used to electrostatically null quadrature-related motion can be symmetrically positioned both above and below the proof masses 320,322, as shown. In similar fashion, the torquer electrodes 428,430,432,434 used to electrically null Coriolis-related motion can also be symmetrically positioned both above and below the proof masses 320,322, as shown.

During operation, the symmetrical configuration of the torquer electrodes used to null quadrature and Coriolis-related proof mass motion can be configured to reduce vibration due to asymmetries in the electrostatic forces applied to the proof masses 320,322. It should be understood, however, that the particular arrangement of the sense and torquer electrodes can differ from that depicted in FIG. 12, if desired. For example, in an out-of-plane gyroscope (OPG) configuration such as that described in U.S. Pat. No. 7,036,373, the quadrature and Coriolis torquer electrodes can be positioned adjacent to and in a manner similar to the interdigitated comb fingers used to detect proof mass motion along the sense axis in the plane of the sensor substrate.

Figure 13:
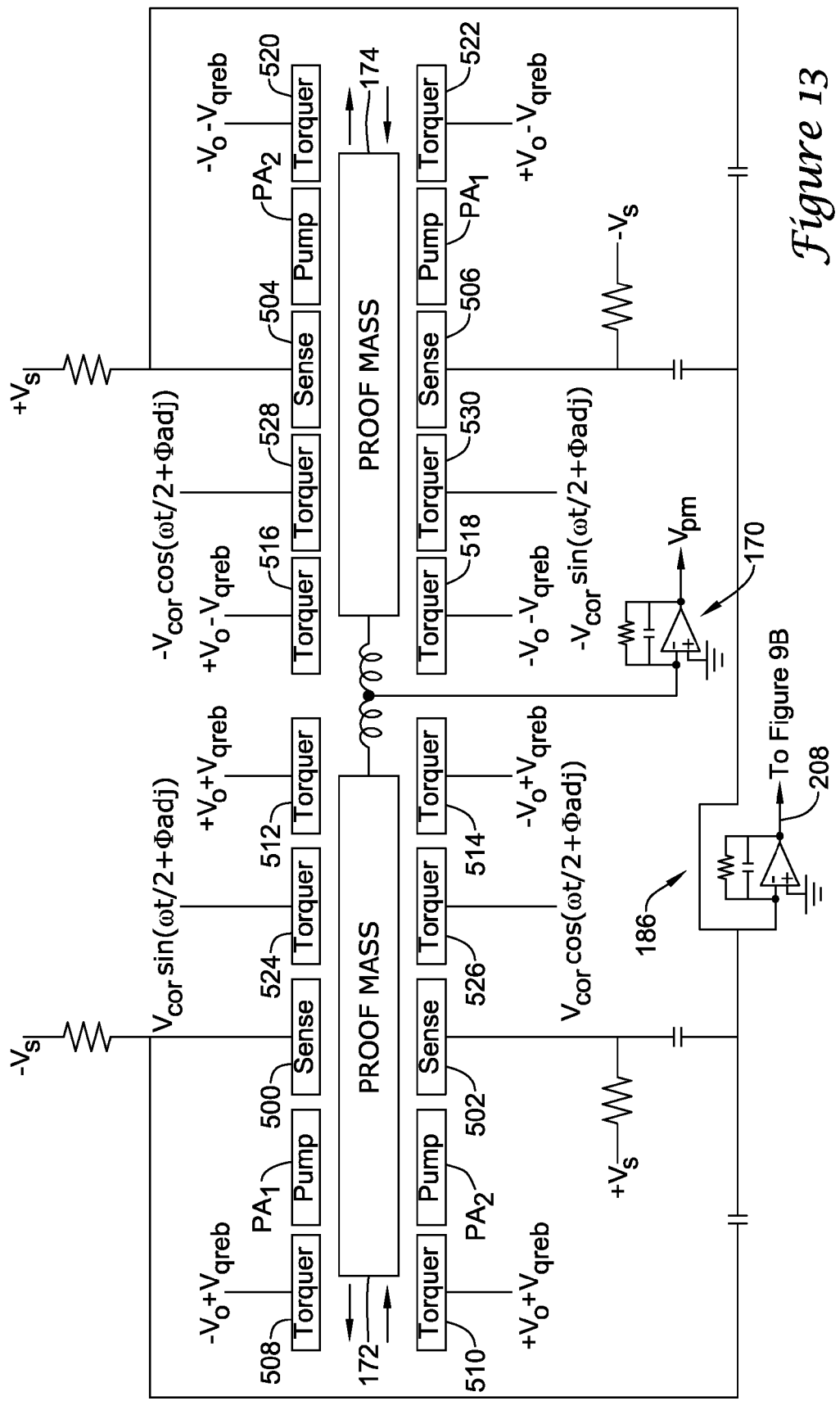
FIG. 13 is a side cross-sectional view showing another illustration sense, torquer, and pump electrode configuration for a MEMS inertial sensor.

FIG. 13 is a side cross-sectional view showing an illustrative sense, torquer and pump electrode configuration for a MEMS inertial sensor. The embodiment of FIG. 13 is similar to that depicted in FIG. 10, with like elements labeled in like fashion. In the illustrative embodiment of FIG. 13, however, the MEMS inertial sensor can further include a number of pump electrodes $PA_1, PA_2$ adjacent to and on opposing sides of the proof masses, which can be used to electrostatically apply pump voltages for parametrically amplifying proof mass motion. As with other embodiments described herein, the voltages applied to the pump electrodes $PA_1, PA_2$ can be alternated with respect to each proof mass, as shown.

Having thus described the several embodiments of the present invention, those of skill in the art will readily appreciate that other embodiments may be made and used which fall within the scope of the claims attached hereto. Numerous benefits of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A MEMS inertial sensor, comprising:
   one or more proof masses adapted to oscillate at a motor drive frequency;
   at least one sense electrode positioned adjacent to each of the one or more proof masses, the sense electrode adapted to sense proof mass motion along a sense axis perpendicular to a drive axis of the one or more proof masses;
   a first number of force rebalancing torquer electrodes coupled to an AC force rebalancing voltage signal and adapted to control Coriolis-related motion of the one or more proof masses; and
   a second number of force rebalancing torquer electrodes coupled to a DC force rebalancing voltage signal and adapted to control quadrature-related motion of the one or more proof masses.

2. The MEMS inertial sensor of claim 1 further comprising:
   at least one pump electrode coupled to a pump voltage and adapted to produce a pumping force on the one or more proof masses in a direction of the sense axis.

3. The MEMS inertial sensor of claim 1, wherein at least one of said AC force rebalancing voltage signal and said DC force rebalancing voltage signal is adapted to maintain a fixed capacitance between each sense electrode and corresponding proof mass.

4. The MEMS inertial sensor of claim 1, wherein at least one of said force rebalancing voltage signals are an output voltage from at least one force rebalancing control loop.

5. The MEMS inertial sensor of claim 4, wherein said at least one force rebalancing control loop comprises multiple force rebalancing control loops.

6. The MEMS inertial sensor of claim 2, wherein the pump voltage has a frequency at approximately twice the motor drive frequency of the one or more proof masses.

7. The MEMS inertial sensor of claim 2, wherein the pumping force produced by the pump voltage is at approximately twice the motor drive frequency of the one or more proof masses.

8. The MEMS inertial sensor of claim 2, wherein the pumping force is adapted to produce non-linear mechanical and electrical mixing within the inertial sensor for parametrically amplifying Coriolis forces exerted on the one or more proof masses along the sense axis.

9. The MEMS inertial sensor of claim 2, wherein the pump voltage includes a DC bias voltage component and an AC pump voltage component adapted to modulate a resonant frequency one of more of the proof masses along the sense axis.

10. The MEMS inertial sensor of claim 1, wherein said MEMS inertial sensor is an in-plane MEMS gyroscope.

11. The MEMS inertial sensor of claim 1, wherein said MEMS inertial sensor is an out-of-plane MEMS gyroscope.

12. A MEMS inertial sensor, comprising:
   one or more proof masses adapted to oscillate at a motor drive frequency;
   at least one sense electrode positioned adjacent to each of the one or more proof masses, the sense electrode adapted to sense proof mass motion along a sense axis perpendicular to a drive axis of the one or more proof masses;
   at least one force rebalancing electrode coupled to a time-varying rebalancing voltage, the time-varying rebalancing voltage having a frequency at half the motor drive frequency; and
   at least one pump electrode coupled to a pump voltage, the pump voltage having a frequency at twice the motor drive frequency of the one or more proof masses;
   wherein a pumping force produced by the pump voltage is adapted to parametrically amplify Coriolis forces exerted on the one or more proof masses along the sense axis.

13. A method of measuring Coriolis forces on a MEMS inertial sensor, comprising the steps of:
   oscillating one or more proof masses at a motor drive frequency;
   sensing any displacement of the one or more proof masses in a sense mode of oscillation along a sense axis perpendicular to a drive axis of the one or more proof masses;
   providing a first rebalancing force to the one or more proof masses along the sense axis, the first rebalancing force for controlling a quadrature-related motion of the one or more proof masses;
   providing a second rebalancing force to the one or more proof masses along the sense axis, the second rebalancing force for controlling a Coriolis-related motion of the one or more proof masses;
   providing a pumping force to the one or more proof masses along the sense axis at approximately twice the motor drive frequency; and
   detecting Coriolis forces on the one or more proof masses in the sense mode of oscillation.

14. The method of claim 13, wherein said step of providing a first and a second rebalancing force to the one or more proof masses includes the step of electrostatically nulling proof mass motion based on voltage signals from at least one force rebalancing control loop.

15. The method of claim 14, wherein said at least force rebalancing control loop includes:
   a first force rebalancing control loop for controlling the quadrature-related motion of the one or more proof masses; and
   a second force rebalancing control loop for controlling the Coriolis-related motion of the one or more proof masses.

16. The method of claim 13, wherein said step of providing a rebalancing force to the one or more proof masses includes the steps of:
    providing a first rebalancing voltage to a first number of torquer electrodes adapted to selectively control the quadrature-related motion of the one or more proof masses along the sense axis; and
    providing a second rebalancing voltage to a second number of torquer electrodes adapted to selectively control the Coriolis-related motion of the one or more proof masses along the sense axis.

17. The method of claim 16, wherein said second rebalancing voltage is a time-varying rebalancing voltage having a frequency approximately half of the motor drive frequency.

18. The method of claim 13, wherein said step of providing a pumping force to the one or more proof masses includes the step of applying a pump voltage to a number of torquer electrodes, the pump voltage including a DC bias voltage component and an AC pump voltage component adapted to modulate a sense mode resonant frequency of the one or more proof masses.

19. The method of claim 13, wherein the pumping force is adapted to produce non-linear mechanical and electrical mixing within the inertial sensor for parametrically amplifying Coriolis related motion of the one or more proof masses.

* * * * *